(12) United States Patent
Yoshimi

(10) Patent No.: US 6,493,738 B1
(45) Date of Patent: Dec. 10, 2002

(54) APPARATUS AND METHOD FOR ROUNDING NUMERICAL VALUES ACCORDING TO SIGNIFICANT DIGITS OR ROUNDING INTERVAL

(75) Inventor: Tomoaki Yoshimi, Kyoto-fu (JP)

(73) Assignee: Data Action Co., Ltd., Kyoto-Fu (JP)

( * ) Notice: Subject to any disclaimer, the term of this patent is extended or adjusted under 35 U.S.C. 154(b) by 0 days.

(21) Appl. No.: 09/283,799

(22) Filed: Apr. 1, 1999

(30) Foreign Application Priority Data

Jan. 28, 1999 (JP) .............................. 11-19982

(51) Int. Cl.[7] .................................. G06F 7/38
(52) U.S. Cl. ........................ 708/551; 708/497
(58) Field of Search .................. 708/550, 551, 708/497, 496

(56) References Cited

U.S. PATENT DOCUMENTS 4,149,261 A * 4/1979 Harigaya et al. ........... 708/551
5,325,316 A * 6/1994 Koshiba ..................... 708/203

FOREIGN PATENT DOCUMENTS

JP           58-52746       * 3/1983

* cited by examiner

Primary Examiner—Chuong Dinh Ngo
(74) Attorney, Agent, or Firm—Knobbe Martens Olson & Bear LLP

(57) ABSTRACT

There is disclosed a method and apparatus for rounding numerals according to the number of significant digits or a rounding interval. The method starts with entering a numerical value x to be rounded and the number of significant digits n or a rounding interval w. The entered numerical value x is stored in a first storage portion of the apparatus. The entered number of significant digits n or rounding interval w is stored in a second storage memory. The numerical value x stored in. the first storage portion is rounded in a digit place determined by the number of significant digits n or rounding interval w stored in the. second storage portion. The numerical value x is rounded while using the number of significant digits n or rounding interval w as it is.

3 Claims, 15 Drawing Sheets

APPARATUS AND METHOD FOR ROUNDING NUMERICAL VALUES ACCORDING TO SIGNIFICANT DIGITS OR ROUNDING INTERVAL

BACKGROUND OF THE INVENTION

The present invention relates to an apparatus and method used for rounding that is necessary for analyses, measurements, investigations, and so on. More particularly, the invention relates to an apparatus and method for performing rounding processing according to significant digits or a rounding interval.

DESCRIPTION OF PRIOR ART

Generally, rounding processing typified by rounding off has enjoyed wide acceptance. Examples include reorganization of experimental data and accounting processes. Many rounding processes are prepared as functions in high-level languages and data-processing software. A user can obtain rounded a numerical value by specifying a numerical value and a digit place to be processed.

FIG. 14 illustrates processing performed using a conventional rounding function. First, a user enters a numerical value x to be processed and a digit place p to be processed (step 601). If the digit place p to be processed is the place of 100, for example, p is −2. If an integer should be derived, p is 0. If the digit place is the third decimal place, p is +3. Then, the digits in the successive digit places of the given numerical value x are stored in turn in memory (step 602). A digit in the digit place immediately to the right of the specified digit place p is read from the memory (step 603). A decision is made as to whether the digit is equal to or greater than 5 (step 604). If the result of the decision is YES (i.e., the numerical value is equal to or greater than 5), rounding up is performed (step 605). If the result of the decision is NO, rounding down is performed (step 606). In this way, the conventional conditional branching processing using a function takes out only one digit from digits in plural digit places. Then, a conditional branch is effected.

The prior art technique described above has the following problems.

(1) It is impossible to specify the processed digit place by significant digits.

Spreadsheet software programs presently available on the market do not have the concept that the processed digit place is specified by significant digits. If a digit place to be processed is counted from the leftmost digit place and specified, other conditional branching processing is necessary so that the processed digit place is specified by significant digits across a decimal point, as long as the prior art conditional branching processing is performed (i.e., only one digit is taken from plural digit places and a decision is made). For example, where 0.0000234 should be rounded to two significant digits, if this numerical value is counted as it is, then the digit in the third decimal place will be taken and a rounding process will be performed. Therefore, digits are taken in turn from the leftmost digit place and counted. A decision is made as to whether each taken digit is 0 or not. If it is 0, this digit place is not counted. In this way, conditional branching processing is needed. Furthermore, where a rounding process is executed with four significant digits, if the numerical value is 30200, "0" in the fourth digit place, "0" in the second digit place, and "0" in the first digit place all need to be counted. In the case of 0.34502, "0" in the first digit place(the most significant digit) is not counted. However, "0" in the fourth decimal place and so on must be counted. Therefore, more conditional branches are necessary.

Where the prior art processing sequence as described above is used, if the digit to be rounded is specified by significant digits, very complicated processing inevitably takes place. For this reason, the prior art function does not make it possible to specify a digit place by significant digits. Furthermore, any spreadsheet software capable of specifying a desired digit place by a significant number is not available.

(2) Rounding processing directly using a rounding interval cannot be performed.

Rounding using a rounding interval is based on ISO (International Standards Organization) 31-0:1992(E), appendix B, "Guide to the rounding of numbers". Rounding using a rounding interval is to replace a given numerical value by a numerical value selected from a sequence of integral multiples of a chosen rounding interval. For instance, where the rounding interval is 0.1, 12.849 is rounded to 12.8 and 13.451 is rounded to 13.5. Where the rounding interval is 10, 1284.9 is rounded to 1280, and 1345.1 is rounded to 1350. Accordingly, in rounding processing using a rounding interval, what is entered first is not the processed digit place but a rounding interval. However, spreadsheet software programs currently available on the market do not have the concept that rounding is performed based on a rounding interval. Hence, it has been impossible to perform a rounding process by directly entering a rounding interval. Therefore, in order to perform the prior art rounding process using a rounding interval, additional processing for converting the rounding interval to the processed digit place is necessary. This complicates the processing, and the processing time is prolonged.

(3) It is impossible to cope with JIS (Japanese Industrial Standard).

Where simple rounding off is used, the result is biased according to the numerical values contained in the data. Therefore, rounding for correcting the biased result and minimizing the round-off error is necessary. JIS stipulates a rounding method for that purpose. Many materials submitted to the public agencies have numerical values that must be rounded in accordance with JIS.

FIG. 15 illustrates a rounding method stipulated by JIS, Z8401. Fundamentally, a round-off process is performed, and the remaining 5 is sorted. Where a numerical value is rounded to a numerical value having n significant digits, a digit in the (n+1)th place and less significant digits are reorganized as follows.

(a) Where a digit in the (n+1)th digit place or a less significant digit is less than half of 1 unit in the nth digit place, the digit is dropped.

(b) Where a digit in the (n+1)th digit place or a less significant digit is in excess of half of 1 unit in the nth digit place, the digit in the nth digit place is increased by 1 unit.

(c) Where the digit in the (n+1)th place or a less significant digit is equal to half of 1 unit in the nth digit place, the following processes (i) and (ii) are carried out.

(i) If the digit in the nth digit place is 0, 2, 4, 6, or 8, the digit is dropped.

(ii) If the digit in the nth digit place is 1, 3, 5, 7, or 9, the digit in the nth place is increased by 1 unit.

Significant digits are counted from the place of the most significant digit that is nonzero. This rounding must be performed in one stage. For example, if 5.346 is rounded to two significant digits by this method, then 5.3 results. If the rounding is done in two stages, the numerical value is rounded to 5.35 in the first stage and to 5.4 in the second stage.

The processing is conducted in the sequence in the manner described below. First, the number of digits is judged (step 701). A decision is made as to whether the digit in the (n+1)th digit place is 6 or more (step 702). If the digit is 6 or more, the digit in the nth digit place is increased by 1. The digit in the (n+1)th place and less significant digits are dropped (step 706). For example, if 13.461 is rounded to three significant digits, 13.5 results.

Then, a decision is made as to whether the digit in the (n+1)th digit place is 4 or less (step 703). If it is 4 or less, the digit in the (n+1)th place and less significant digits are dropped (step 707). For example, if 12.849 is rounded to three significant digits, 12.8 is derived.

If the digit in the (n+1)th place is neither equal to or greater than 6 nor equal to or less than 4, i.e., the digit in the (n+1)th digit place is 5, a decision is made as to whether the digit in the (n+2)th place and less significant digits are all 0 (step 704). If the digit in the (n+2)th place and less significant digits contain nonzero numeral or numerals, the digit in the nth digit place is increased by 1, and the digit in the (n+1)th place and less significant digits are deleted (step 706). For example, if 13.451 is rounded to three significant digits on this principle, 13.5 results.

If the digit in the (n+2)th digit place and less significant digits are all 0, a decision is made as to whether the digit in the nth place is even or odd (step 705). If the result is that the digit is even, then the digit in the (n+1)th place and less significant digits are deleted (step 707). For example, if 11.450 is rounded to three significant digits, 11.4 results. Conversely, if the digit in the nth place is odd, the digit in the nth place is increased by 1, and the digit in the (n+1)th place and less significant digits are dropped (step 706). For instance, if 12.750 is rounded to three significant digits, 12.8 arises.

However, if digits necessary for decision are taken from all the digit places of the digits as in the conditional branching processing using the prior art round-off function, and if the taken digits are treated as one number, numerous conditional branches (steps 804–807) are necessary in the conditional branching of step 704 of FIG. 15, as illustrated in FIG. 16.

This portion is used to judge that the digit in the (n+1)th digit place is 5 and that the less significant digits are all 0. Where necessary digits are extracted from all digit places and treated as one number, the digits in all the digit places must be judged.

For example, where digits located to the right of a rounded digit are 50000001, JIS demands rounding up. If a human makes a decision by his eyes, he can immediately sense that a nonzero digit is present in some less significant digit place. Where a computer is used, the method of decision presents a problem. In the prior art processing where a decision is made for each digit place, a decision is made as to whether the digit in the (n+2)th digit place 0 or not. Then, a decision is made as to whether the digit in the (n+3)th place is 0 or not. Subsequently, a decision is made as to whether the digit in the (n+4)th place is 0 or not. In this way, decisions are made up to the rightmost digit place to judge whether 0 is not contained at all in the (n+2)th and the following places or any nonzero numeral is present in any digit place. Since the digits in the successive digit places are judged in turn, the final judgment cannot be made until a multiplicity of branching operations are carried out.

Where the number of digits capable of being calculated by the today's computer is contemplated, it is expected that the number of the conditional branch operations will be exorbitant. Accordingly, in the conventional procedure, it is necessary to limit the number of treated digits to far below the processing capability of the computer to reduce the number of the necessary conditional branch operations. Therefore, even if the procedure is treated in terms of software, calculation is urged to be performed at a level considerably lower than the computer's computational capability. This narrows the range that can be processed. As a result, the software would not be viable on the market. In this way, the present situation is that any software capable of performing rounding operations in accordance with JIS Z8401 has not been developed or put into practice.

In the rounding processing described above, it is impossible to directly enter a rounding interval for rounding processing. In order to perform the prior art rounding process using a rounding interval, additional processing for converting the rounding interval into a digit place is necessary. Also, in this case, the processing is complicated and the processing time is prolonged.

SUMMARY OF THE INVENTION

It is an object of the present invention to provide an apparatus and method capable of performing a rounding process by rounding a numerical value, using significant digits or a rounding interval as it is.

It is another object of the invention to provide an apparatus and method capable of rounding numbers with minimum round-off error as in accordance with JIS (Japanese Industrial Standard), using significant digits or a rounding interval as it is.

A rounding apparatus in accordance with the present invention comprises an input portion for entering a numerical value x to be rounded and the number of significant digits n or a rounding interval w, a first storage portion for storing the entered numerical value x, a second storage portion for storing the entered number of significant digits n or rounding interval w, and a rounding processing portion for rounding the numerical value x stored in the first storage portion in a digit place specified by the number of significant digits n or rounding interval w stored in the second storage portion. This apparatus can round the numerical value while using the number of significant digits or rounding interval as it is.

Other objects and features of the invention will appear in the course of the description thereof, which follows.

DETAILED DESCRIPTION OF THE PREFERRED EMBODIMENTS

Figure 1:
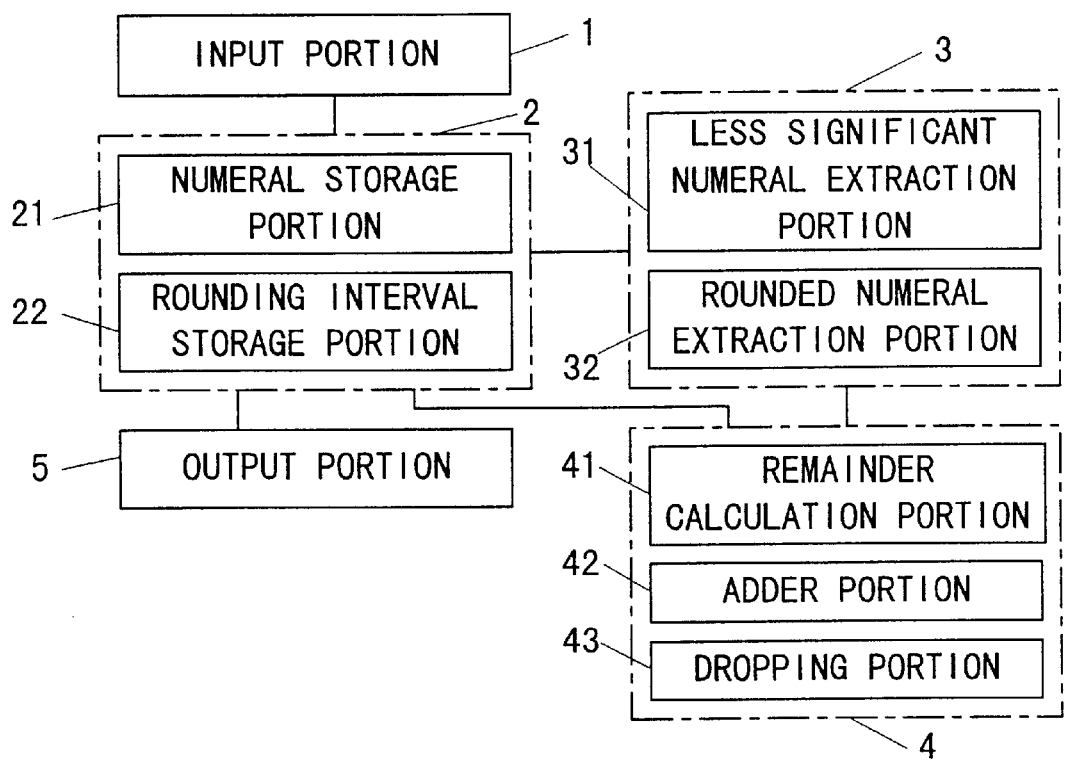
FIG. 1 is a block diagram of a rounding processor in accordance with a first embodiment of the present invention.

The preferred embodiments of the present invention are hereinafter described by referring to the drawings. A rounding processor in accordance with a first embodiment of the present invention is shown in FIG. 1 in block-diagram form. First and second embodiments described below pertain to rounding processors for performing rounding processes using a rounding interval.

Referring to FIG. 1, the rounding processor comprises an input portion 1, a storage portion 2, an extraction portion 3, a rounding processing portion 4, and an output portion 5. The storage portion 2 has a numeral storage portion 21 and a rounding interval storage portion 22. The extraction portion 3 has a less significant numeral extraction portion 31 and a rounded numeral extraction portion 32. The rounding processing portion 4 has a remainder calculation portion 41, an adder portion 42, and a dropping portion 43.

The input portion 1 is used to enter a numerical value x to be rounded and a rounding interval w. The numeral storage portion 21 stores digits in the successive digit places of the entered numerical value x. The rounding interval storage portion 22 stores the entered rounding interval w. The less significant numeral extraction portion 31 extracts a numerical value y from the numerical value x stored in the numeral storage portion 21, the numerical value y being formed by digits in digit places to the right of a digit place corresponding to the rounding interval w stored in the rounding interval storage portion 22. The rounded numeral extraction portion 32 extracts a rounded digit R from the numerical value x stored in the numeral storage portion 21, the digit R being placed in a digit place corresponding to the rounding interval w stored in the rounding interval storage portion 22. The remainder calculation portion 41 calculates the remainder b when the rounded digit R extracted by the rounded numeral extraction portion 32 is divided by 2. If the rounding interval w stored in the rounding interval storage portion 22 is less than twice of the less significant numerical value y extracted by the less significant numeral extraction portion 31, or if the rounding interval w stored in the rounding interval storage portion 22 is equal to twice of the less significant numerical value y extracted by the less significant numeral extraction portion 31 and, at the same time, the remainder b calculated by the remainder calculation portion 41 is 1, then the adder portion 42 adds 1 to the rounded digit R extracted by the rounded numeral extraction portion 32 and rewrites the rounded digit R stored in the numeral storage portion 21. The dropping portion 43 deletes the less significant numerical value y extracted by the less significant numeral extraction portion 31 and changes the digits forming the less significant numerical value y in the numeral storage portion 21 to 0. The output portion 5 produces a rounded numerical value formed by the rewritten digits stored in the numeral storage portion 21. A rounded numeral storage portion for storing a rounded numerical value may be formed in the storage portion 2 independent of the numeral storage portion 21.

Figure 2:
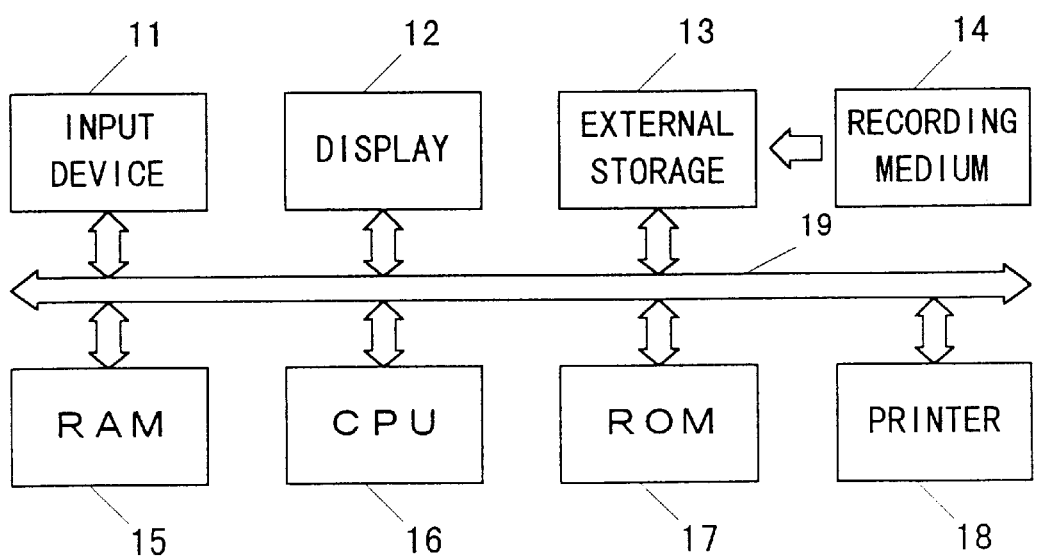
FIG. 2 is a block diagram of one example of the hardware of the rounding processor shown in FIG. 1, realized using a computer.

On example of hardware of the aforementioned rounding processor realized using a computer is shown in FIG. 2.

This rounding processor comprises an input device 11, a display device 12, an external storage 13, a recording medium 14, a RAM 15, a CPU 16, a ROM 17, a printer 18, and a bus line 19. The input device 11 comprises a keyboard having a ten-key pad, a mouse, etc., and is used by the user to select desired processing or to enter a numerical value x rounded and a rounding interval w. The entered data are sent to the CPU 16 via the bus line 19. If necessary, the data are stored in the RAM 15 or on the recording medium 14 in the external storage 13. The display device 12 comprises a liquid crystal display, a CRT, or the like, and displays a desired frame of image. The external storage 13 comprises a hard disk drive, a floppy disk drive, a CD-ROM drive, a magneto-optical drive, or the like. The external storage 13 records data processed by the CPU 16 on the recording medium 14, for example, a hard disk, a floppy disk, a CD-ROM, a magneto-optical disk, or the like, or sends data recorded on the recording medium 14 to the CPU 16. The data processed by the CPU 16 is stored in the RAM 15. If necessary, the data are read out by the CPU 16. A program for performing the functions of the rounding processor shown in FIG. 1 is stored in the ROM 17 or in the recording medium 14. The CPU 16 controls various components via the bus line 19 in accordance with this program. The printer 18 comprises a laser printer or the like, and prints out data processed by the CPU 16.

The rounding processor constructed in this way and shown in FIG. 2 corresponds to the rounding processor shown in FIG. 1 as follows, for example. The input portion 1 corresponds to the input device 11, the RAM 15, and/or the external storage 13. The storage portion 2 corresponds to the RAM 15 and/or the external storage 13. The extraction portion 3 and the rounding processing portion 4 correspond to the CPU 16. The output portion 5 corresponds to the display device 12 and/or the printer 18. The program corresponding to the rounding processing described below may be previously stored in the ROM 17. Alternatively, the program may be installed from the recording medium 14 such as a CD-ROM, a floppy disk, a magneto-optical disk, or a semiconductor memory, using the external storage 13.

No limitations are imposed on the computer described above. An ordinary computer can be used. For example, a server, a desktop computer, a laptop computer, a portable terminal, or the like may be used. Furthermore, it can be an analytical instrument or a measuring instrument equipped with a microcomputer or the like. In addition, no limitations are placed on the used programming language. The program can be written in terms of various languages. In the case of an analytical instrument or measuring instrument, a calculation/measurement result storage portion for storing numerical data of the measurement or experiment results and of the calculation results data may be incorporated in the recording medium 14 of the external storage 13 or in the RAM 15. These principles apply similarly to the descriptions given below.

Figure 3:
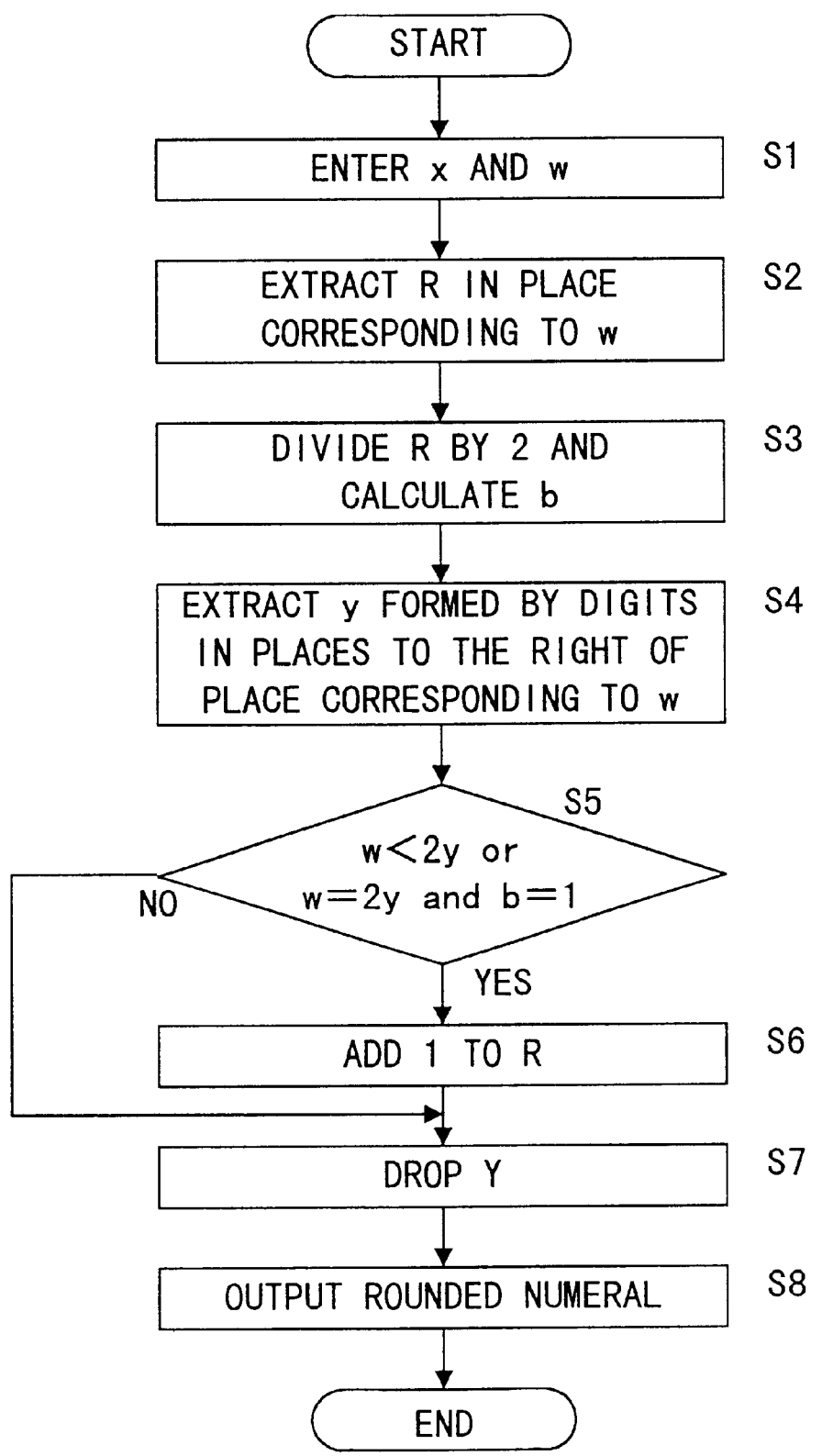
FIG. 3 is a flowchart illustrating rounding processing performed by the rounding processor shown in FIG. 1.

The rounding processing executed by the rounding processor constructed as described above is next described in detail. FIG. 3 is a flowchart illustrating the rounding performed by the rounding processor shown in FIG. 1.

As shown in FIG. 3, in step 1, a numerical value x to be rounded and a rounding interval w are entered from the input portion 1. Digits in the successive digit places of the numerical value x are stored in the numeral storage portion 21. The rounding interval w is stored in the rounding interval storage portion 22. A human operator may directly enter the numerical value x by the use of the input portion 1. In the case of a measuring instrument and the like, numerical values stored in the calculation/measurement result storage portion of the storage portion 2 may be entered into the numeral storage portion 21 and into the rounding interval storage portion 22.

In the next step 2, the rounded numeral extraction portion 32 extracts a rounded digit R from the numeral storage portion 21, the digit R being placed in a digit place corresponding to the rounding interval w. For example, if 12.354 is entered as the numerical value x and 0.1 is entered as the rounding interval w, digit "3" in the first decimal place corresponding to the rounding interval of 0.1 of digits "1", "2", "3", "5", and "4" stored in the numeral storage portion 21 is extracted.

In the next step 3, the rounded digit R is divided by 2 by the remainder calculation portion 41, resulting in a remainder of b which is either 0 or 1. If the remainder b is 0, the rounded digit R is even. If the remainder is 1, the rounded digit R is odd.

In the next step 4, the less significant numeral extraction portion 31 extracts a less significant numerical value y composed of digits in successive digit places to the right of the digit place corresponding to the rounding interval w. For example, if 12.354 is entered as the numerical value x and 0.1 is entered as the rounding interval w, a less significant numeral 0.054 composed of digits "5" and "4" in digit places to the right of the digit place corresponding to the rounding interval of 0.1 is extracted from "1", "2", "3", "5", and "4" stored in the numeral storage portion 21.

In the next step 5, the adder portion 42 makes a decision as to whether the rounded interval w is smaller than the twice of the less significant numerical value y or whether the rounded interval w is equal to the twice of the less significant numerical value y and, at the same time, the remainder b is 1. If the rounding interval w is smaller than the twice of the less significant numerical value y or if the rounded interval w is equal to the twice of the less significant numerical value y and, at the same time, the remainder b is 1, control goes to step 6. If the result of the decision is NO (i.e., the rounding interval w is greater than twice of the less significant numeral or the rounding interval w is equal to twice of the less significant numerical value y and, at the same time, the remainder b is 0), control proceeds to step 7.

This method is compared with the rounding method in accordance with JIS (Japanese Industrial Standard) described above. Where the rounding interval w is smaller than the twice of the less significant numerical value y, a numerical value composed of digits in successive digit places to the right of the (n+1)th digit place is in excess of half of 1 unit in the nth digit place, i.e., the digit in the nth place is increased by 1 unit. Where the rounded interval w is equal to the twice of the less significant numerical value y and, at the same time, the remainder b is 1, a numerical value composed of digits in successive digit places to the right of the (n+1)th digit place is half of 1 unit in the nth place, and the digit in the nth place is 1, 3, 5, 7, or 9, i.e., the digit in the nth place is increased by 1 unit. Where the rounding interval w is greater than the twice of the less significant numerical value y, a numerical value composed of digits in successive digits to the right of the (n+1)th place is smaller than 1 unit in the nth place, i.e., rounding off is performed. Where the rounding interval w is equal to the twice of the less significant numerical value y and, at the same time, the remainder b is 0, the numerical value composed of digits in digit places to the right of the (n+1)th place is half of 1 unit in the nth digit place, and the digit in the nth digit place is 0, 2, 4, 6, or 8, i.e., rounding off is performed. Therefore, the decision processing described above is adapted for decision processing in rounding of numerals in accordance with JIS.

In step 5, if the result of the decision is that the rounding interval w is smaller than the twice of the less significant numerical value y, or if the rounding interval w is equal to the twice of the less significant numerical value y and, at the same time, the remainder b is 1, then control goes to step 6. One is added to the rounded digit R, rewriting the rounded digit R stored in the numeral storage portion 21 (step 6). If a carry occurs in an addition, the rounded digit R is rewritten as 0. One is added to the digit in the digit place immediately to the left of the digit place of the rounded digit R, thus rewriting the numerical value.

In the next step 7, the less significant numerical value y is deleted, and the digits forming the less significant numerical value y stored in the numeral storage portion 21 are changed to 0.

Finally, in step 8, a numerical value (i.e., rounded numerical value x) composed of the rewritten digits stored in the numeral storage portion 21 is output.

As a result of the steps 5–7, if the rounding interval w is smaller than the twice of the less significant numerical value y (i.e., the numerical value formed by digits in digit places to the right of the (n+1)th digit place is in excess of half of 1 unit in the nth digit place, or if the rounding interval w is equal to the twice of the less significant numerical value y and, at the same time, the remainder b is 1 (i.e., the numerical value formed by digits in digit places to the right of the (n+1)th digit place is half of 1 unit of the nth digit place and, at the same time, the digit in the nth digit place is 1, 3, 5, 7, or 9), then 1 is added to the rounded digit R, and the less significant numerical value y is dropped. Thus, rounding up is performed.

Meanwhile, if the rounding interval w is greater than the twice of the less significant numerical value y (i.e., the numerical value formed by digits in digit places to the right of the (n+1)th digit place is less than half of 1 unit in the nth digit place), or if the rounding interval w is equal to the twice of the less significant numerical value y and, at the same time, the remainder b is 0 (i.e., the numerical value formed by digits in digit places to the right of the (n+1)th place is half of 1 unit in the nth place and the numeral in the nth place is 0, 2, 4, 6, or 8), the rounded digit R is left as it is, and the less significant numerical value y is dropped. Thus, a rounddown operation is carried out.

Therefore, because of the processing described above, the rounding interval can be used as it is for comparisons without converting the rounding interval into a digit place. Also, a rounding operation for minimizing rounding-off error as in JIS can be performed. In the processing described above, the multiplier and the divisor are 2 and so in the case of a binary system, multiplications and divisions can be done simply by means of shifting operations. Hence, a rounding operation can be performed with less process steps. Consequently, it is easy to prepare the program. Also, the processing time can be shortened.

Figure 4:
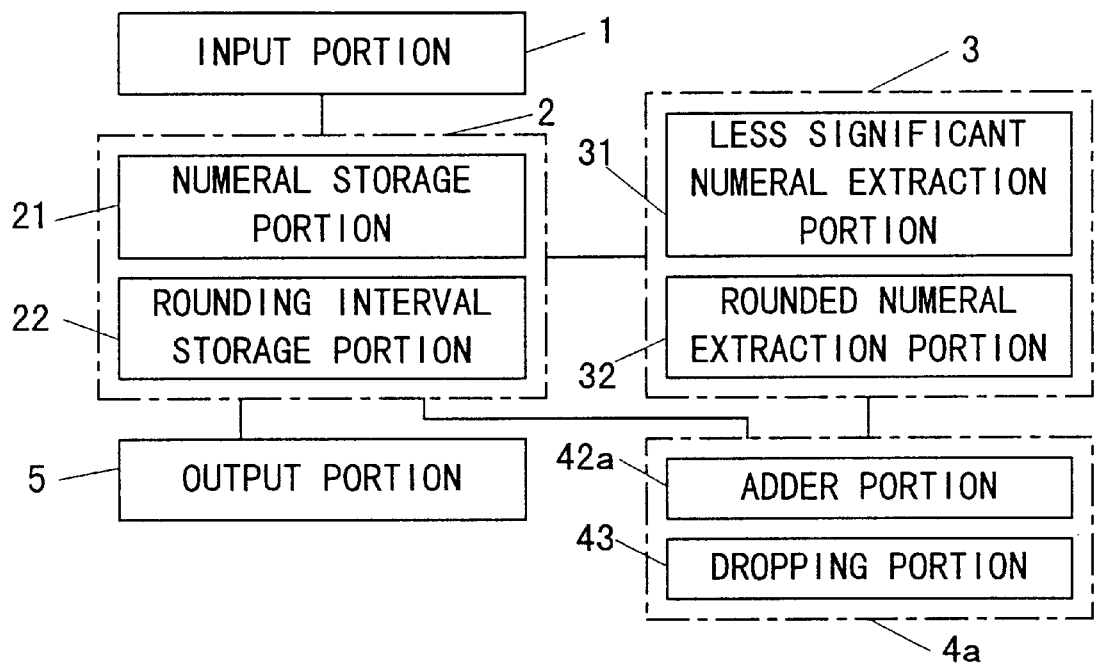
FIG. 4 is a block diagram of a rounding processor in accordance with a second embodiment of the invention.

A rounding processor in accordance with a second embodiment of the invention is next described. FIG. 4 is a block diagram of this rounding processor, which performs round-off operations using a rounding interval as it is. This processor shown in FIG. 4 is similar to the rounding processor shown in FIG. 1 except that the remainder calculation portion 41 of the rounding processor shown in FIG. 1 is omitted and that the adder portion 42 is replaced by an adder portion 42a which makes decisions based on different conditions. Therefore, like components are indicated by like reference numerals and those components which have been already described will not be described below. Hardware of the rounding processor shown in FIG. 4 that is realized using a computer is similar to the hardware shown in FIG. 2 and thus will not be illustrated.

As shown in FIG. 4, a rounding processing portion 4a comprises the adder portion 42a and the dropping portion 43. If the rounding interval w stored in the rounding interval storage portion 22 is equal to or smaller than the twice of the less significant numerical value y extracted by the less significant numeral extraction portion 31, then the adder portion 42a adds 1 to the rounded digit R extracted by the rounded value extraction portion 32, and the rounded digit R stored in the numerical storage portion 21 is rewritten.

Figure 5:
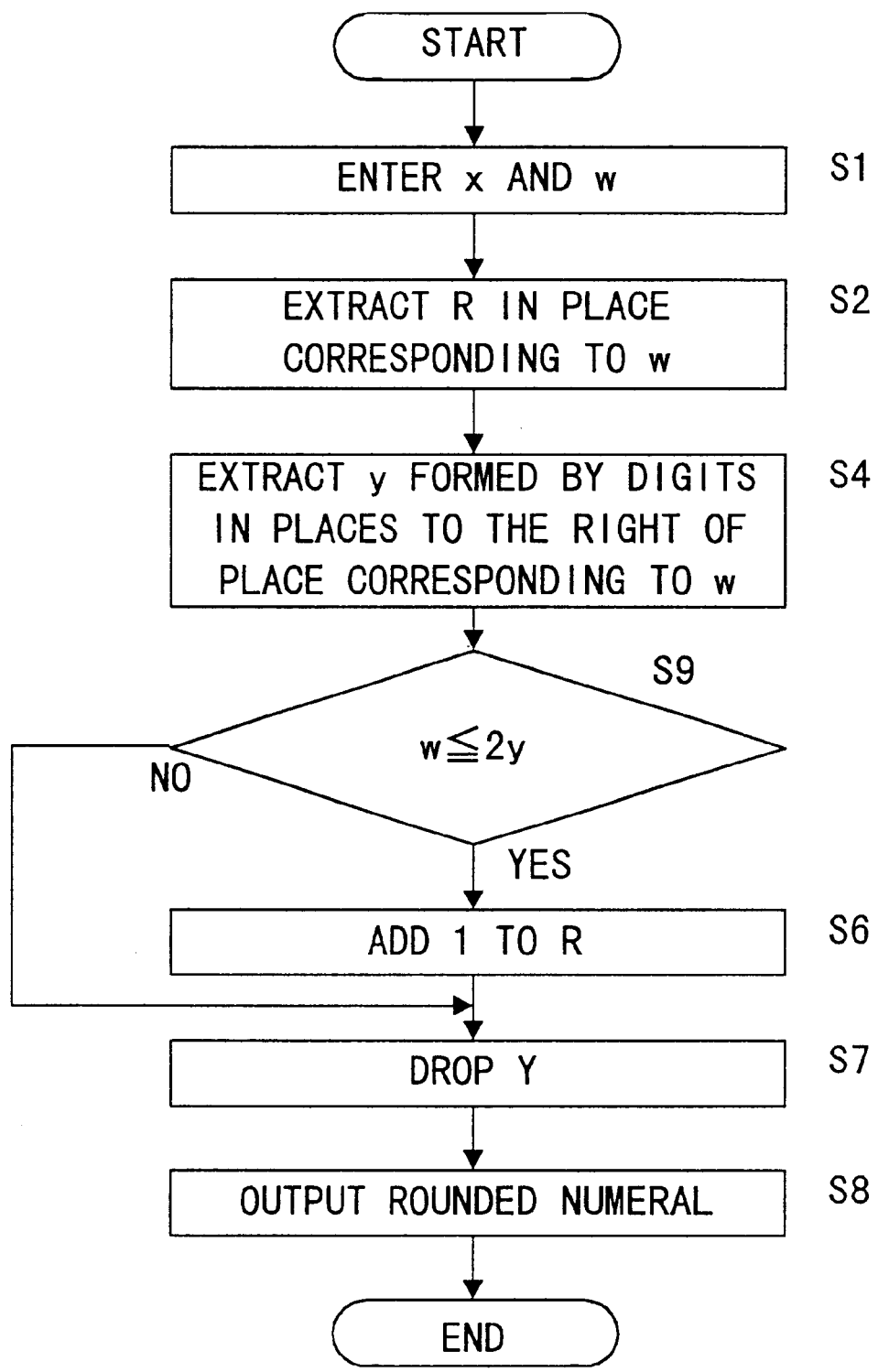
FIG. 5 is a flowchart illustrating rounding processing performed by the rounding processor shown in FIG. 4.

The rounding processing executed by the rounding processor constructed as described above is next described. FIG. 5 is a flowchart illustrating the rounding processing performed by the rounding processor shown in FIG. 4. The flowchart of FIG. 5 is similar to the flowchart of FIG. 3 except that step 3 of the flowchart of FIG. 3 is omitted and that step 5 is changed to step 9. Therefore, only their differences are described.

As illustrated in FIG. 5, in steps 1, 2, and 4, processing similar to that performed in steps 1, 2, and 4 of FIG. 3 is performed. In step 9, a decision is made as to whether the rounding interval w is equal to or smaller than the twice of the less significant numerical value y. If the result of this decision is YES, control goes to step 6. If the result of the decision is NO (i.e., the rounding interval w is greater than the twice of the less significant numerical value y), control proceeds to step 7. That the rounding interval w is equal to or smaller than the twice of the less significant numerical value y means that the most significant digit of the less significant number y is equal to or greater than 5, i.e., a round-up operation is performed. That the rounding interval w is greater than the twice of the less significant numerical value y means that the most significant digit of the less significant numerical value y is 4 or less, i.e., a round-down operation is performed.

In the next steps 6–8, processing similar to the processing of steps 6–8 of FIG. 3 is performed. Finally, a numerical value composed of rewritten digits stored in the numeral storage portion 21, i.e., a numerical value obtained by rounding off the numerical value x, is produced. Accordingly, in the present embodiment, the rounding interval can be used as it is for comparisons in rounding processing without converting the rounding interval into a digit place. In the processing described above, 2 is used as the multiplier. Therefore, in the binary system, multiplications are performed simply by means of shifting operations.

In consequence, rounding processing can be performed with less process steps. Hence, it is easy to prepare the program. Also, the processing time can be shortened.

Figure 6:
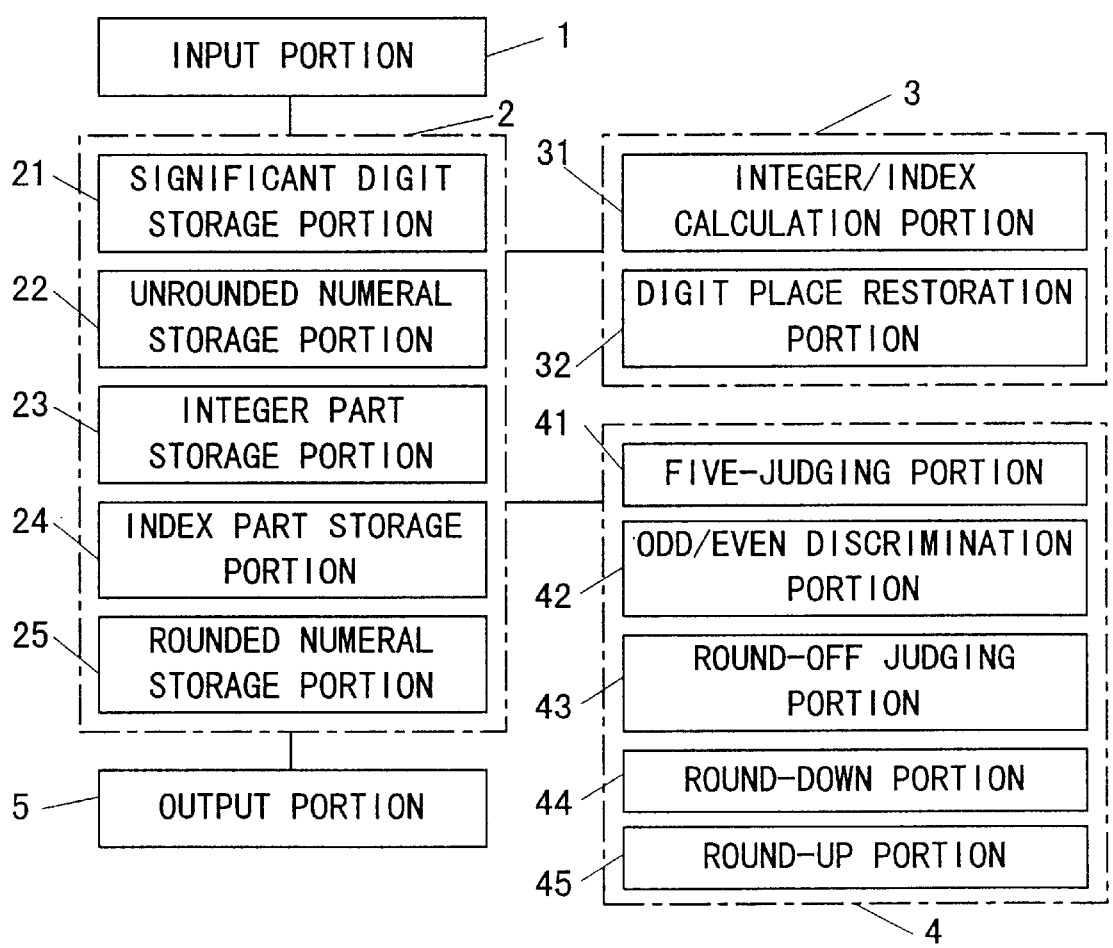
FIG. 6 is a block diagram of a rounding processor in accordance with a third embodiment of the invention.

A rounding processor in accordance with a third embodiment of the present invention is next described. FIG. 6 is a block diagram showing the structure of this rounding processor that specifies significant digits and performs a round-off operation. This round-off operation can be carried out by combining a round-down procedure illustrated in FIG. 9 with a round-up procedure illustrated in FIG. 11.

As shown in FIG. 6, the rounding processor comprises an input portion 1, a storage portion 2, an arithmetic portion 3, a rounding processor portion 4, and an output portion 5. The storage portion 2 comprises a significant digit storage portion 21, an unrounded numeral storage portion 22, an integer part storage portion 23, an index part storage portion 24, and a rounded numeral storage portion 25. The arithmetic portion 3 comprises an integer/index calculation portion 31 and a digit place restoration portion 32. The rounding processor 4 comprises a five-judging portion 41, an odd/even discrimination portion 42, a round-off judging portion 43, a round-down portion 44, and a round-up portion 45.

The input portion 1 is used to enter a numerical value x to be rounded and the number of significant digits n. The unrounded numeral storage portion 22 stores all the digits in successive digit places of the entered numerical value x. The significant digit storage portion 21 stores the entered number of significant digits n. The integer/index calculation portion 31 calculates an integer K and an index M where the numerical value x stored in the unrounded numeral storage portion 22 is represented in $K \times 10^M$ form. That is, the original numeral is represented by the product of K and $10^M$, where K is a numeral whose least significant digit is not zero, and nonzero values are not present in decimal places. The index part storage portion 24 stores the index M calculated by the integer/index calculation portion 31. The integer part storage portion 23 stores the integer K calculated by the integer/index calculation portion 31. The five-judging portion 41 takes a numerical value formed by digits in digit places of the integer K stored in the integer part storage portion 23 which are located in the (n+1)th and following digit places, and makes a decision as to whether this taken numerical value is equal to 5. If the result of the decision is YES (i.e., it is equal to 5), the odd/even discrimination portion 42 divides the digit in the nth digit place of the integer K by 2, and makes a decision as to whether the remainder is 0. If the decision made by the five-judging portion 41 is that the taken one numeral is not equal to 5, the round-off judging portion 43 makes a decision as to whether the digit in the (n+1)th digit place of the integer K is equal to or greater than 5. If the odd/even discrimination portion 42 judges that the remainder is 0, or if the round-off judging portion 43 judges that the digit in the (n+1)th digit place is not equal to or greater than 5, the round-down portion 44 deletes digits in the (n+1)th and the following digit places, and rewrites the integer K in the integer part storage portion 23. The round-up portion 45 increases the digit in the nth digit place of the integer K by 1, deletes the digits in the (n+1)th and following digit places, and rewrites the integer K in the integer part storage portion 23, if the odd/even discrimination portion 42 judges that the remainder is non-zero or if the round-off judging portion 43 judges that the digit in the (n+1)th place is 5 or more. Because of the processing described above, the integer K is rounded with n significant digits using the integer K stored in the integer part storage portion 23 as well as the number of significant digits n stored in the significant digit storage portion 21. The rounded integer L can be stored in the integer part storage portion 23. The digit place restoration portion 32 calculates $L \times 10^M$, using the integer L stored in the integer part storage portion 23 and the index M stored in the index part storage portion 24, restores the digit place, and stores the result of the calculation in the rounded numeral storage portion 25. The output portion 5 delivers the numerical value with n significant digits stored in the rounded value storage portion 25. Instead of providing the rounded value storage portion 25, the numeral in the unrounded numeral storage portion 22 may be directly rewritten, and the rewritten numeral in the unrounded numeral storage portion 22 may be delivered from the output portion 5.

This rounding processor can also be constructed using the hardware shown in FIG. 2 and so the relation between the hardware and the rounding processor using a computer is described by referring to FIG. 2.

The hardware shown in FIG. 2 and the rounding processor shown in FIG. 6 have the following relationship. The input portion 1 corresponds to the input device 11, the RAM 15, and/or the external storage 13. The storage portion 2 corresponds to the RAM 15 and/or the external storage 23. The arithmetic portion 3 and the rounding processing portion 4 correspond to the CPU 16. The output portion 5 corresponds to the display device 12 and/or the printer 18.

Figure 7:
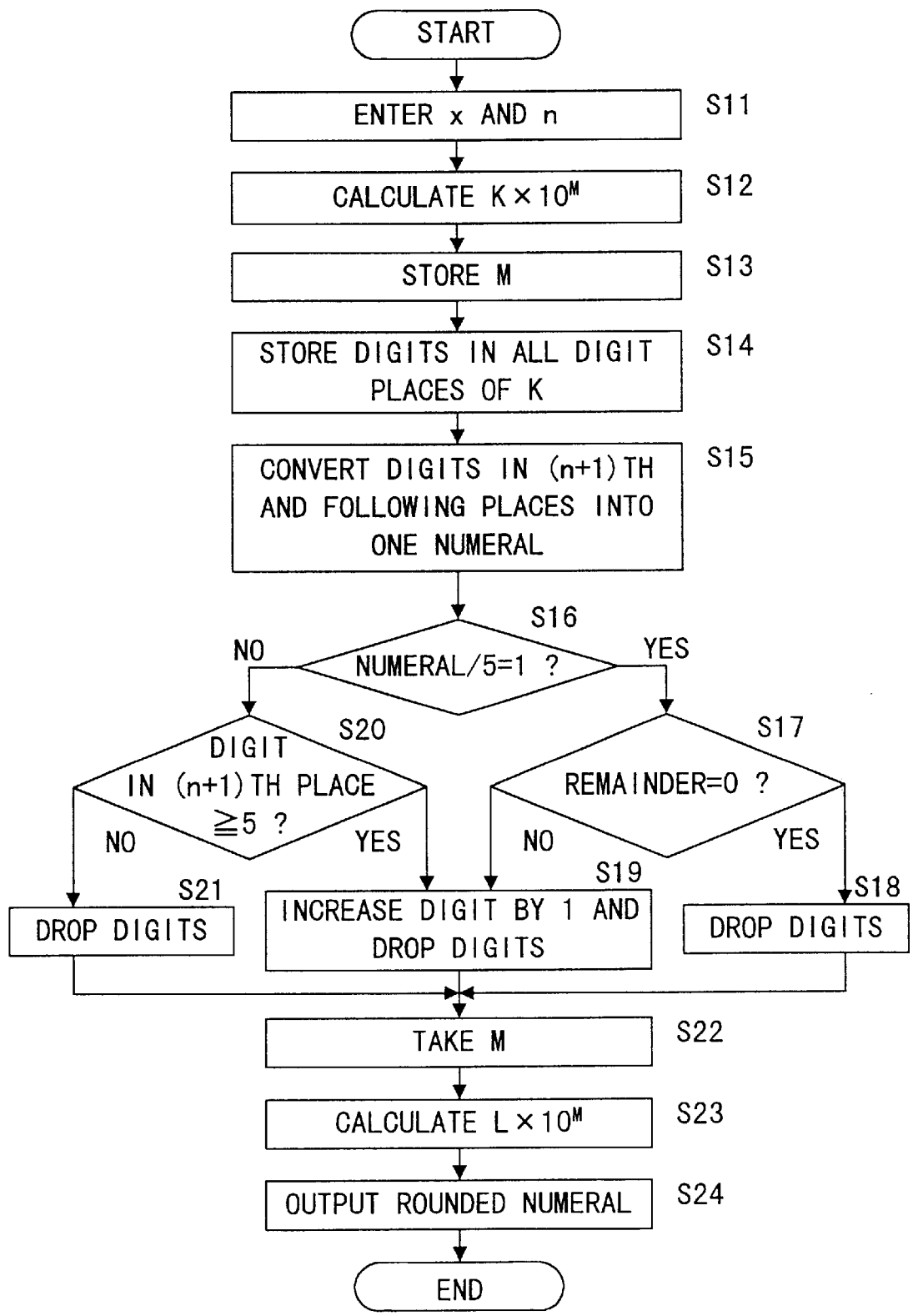
FIG. 7 is a flowchart illustrating rounding processing performed by the rounding processor shown in FIG. 6.

The rounding processing executed by the rounding processor constructed as described above is next described in detail. FIG. 7 is a flowchart illustrating the rounding processing performed by the rounding processor shown in FIG. 6.

Referring to FIG. 7, in step 11, a numerical value x to be rounded and the number of significant digits n are first entered from the input portion 1. The digits in the successive digit places of the numerical value x are stored in the unrounded numeral storage portion 22. The number of significant digits n is stored in the significant digit storage portion 21. The numerical value x may be entered directly by the operator through the input portion 1. In the case of a measuring instrument and the like, numerals stored in the calculation/measurement result storage portion of the storage portion 2 may be loaded into the unrounded numeral storage portion 22 and into the significant digit storage portion 21.

In the next step 12, the numerical value x yet to be processed is divided into an integer part and an index part. The integer/index calculation portion 31 calculates integer K and index M where $x=K \times 10^M$, in which the least significant digit of K is nonzero, and the original numeral is represented in terms of $10^M$ such that nonzero digits are not present in decimal places. For example, if x is 0.00021, it can be written as $21 \times 10^{-5}$. Therefore, K is 21 and M is −5. If the numerical value x is 320100, it can be written as $3201 \times 10^2$. Therefore, the integer K is 3201 and the index M is 2.

In the next step 13, the calculated index M is stored in the index part storage portion 24. In step 14, the digits in successive digit places of the calculated integer K are stored in the integer part storage portion 23. For example, if the integer K is 3201, the digits 3, 2, 0, and 1 in the successive digit places are separately stored.

In the next step 15, a digit in the (n+1)th digit place and digits in the following digit places of the integer K stored in the integer part storage portion 23 are returned to one numeral by the five-judging portion 41. Thus, the numeral is divided into a first part between the leftmost digit place and the nth digit place and a second part in the (n+1)th and the following digit places. The digits in the (n+1)th and the following digit places are taken as one numeral. In the next step 16, the five-judging portion 41 divides this taken numeral by 5, and makes a decision as to whether the quotient is 1 or not.

In the present embodiment, the numerical value x yet to be rounded is divided into an integer part and an index part, and the number formed by digits in the (n+1)th and the following digit places of the integer K is divided by 5 because of the processing described above. A decision substantially the same as the decision made as to whether the digits in the (n+2)th and the following places are all zero where the digit in the (n+1)th place is 5 can be made. This decision has been regarded as being difficult to make where rounding is done in accordance with JIS. In particular, where a number formed by digits in the (n+1)th place and in the following digit places is 5 (i.e., the least significant nonzero digit of the numeral is 5), the most serious problem takes place. In the present invention, the unrounded numerical value x is represented in terms of an index, and its integer part is used. Therefore, in such a case, the digit in the first digit place located to the left of the decimal point of the integer K is always 5. Since the nth digit place is the second place located to the left of the decimal point of the integer K, if the processing of step 15 is undergone, 5 is taken as a number formed by digits in the (n+1)th and the following places. This taken numeral 5 is divided by 5, and a decision is made as to whether the quotient is 1. Therefore a case in which the least significant digit of the unrounded numerical value x is 5 and this digit place corresponds to the (n+1)th digit place can be found.

Where 0.0125 is rounded with two significant digits in accordance with JIS, if the numeral is divided into an integer part and an index part, the numeral is given by $125 \times 10^{-4}$. Therefore, the integer K is 125 and the index M is −4. If 125 is divided into a first portion up to the nth digit part (in this case, up to the second digit part) and a second portion in the (n+1)th digit place and following digit places (in this case, the third digit place), the numeral is divided into 12 and 5. If the latter numeral 5 is divided by 5, then 1 results. On the other hand, where 0.0125001 is rounded with two significant digits in accordance with JIS, if the numeral is divided into an integer part and an index part, $125001 \times 10^{-7}$ results. Therefore, the integer K is 125001 and the index M is −7. If 125001 is divided into a first portion up to the second digit place and a second portion to the right of the second digit place, the numeral is divided into 12 and 5001. However, if 5001 is divided by 5, the quotient is not equal to 5. In this case, therefore, an ordinary round-off operation should be performed.

If the result of the decision made in step 16 is that the quotient (i.e., the numeral formed by digits in the (n+1)th and the following digit places divided by 5) is 1, control goes to step 17, where the digit in the nth digit place of the integer part K stored in the integer part storage portion 23 is read. A decision is made as to whether the remainder occurring when the digit in the nth place is divided by 2 is 0 or not. If the remainder is judged to be 0 (i.e., the digit in the nth place is even), the round-down portion 44 deletes digits in the (n+1)th and the following digit places. If the result of the decision is that the remainder is not 0 (i.e., the numeral in the nth digit place is odd), the round-up portion 45 increases the digit in the nth place by 1 and deletes the digits in the (n+1)th and the following digit places, thus performing rounding up.

If the result of the decision made in step 16 is that the quotient (the numeral formed by the digits in the (n+1)th and the following places divided by 5) is not 1, an ordinary round-off operation is performed (steps 20, 19, and 21). That is, in step 16, a case in which the digit in the (n+1)th digit place is 5 and all digits in the (n+2)th and following digit places are zero is detected. In other cases, if an ordinary round-off operation is performed, it is possible to cope with JIS. First, in step 20, the round-off judging portion 43 reads the digit in the (n+1)th digit place and makes a decision as to whether it is equal to or greater than 5. At this time, if the digit in the (n+1)th digit place is equal to or greater than 5, control proceeds to step 19, where rounding up is performed. If the digit in the (n+1)th digit place is not equal to or greater than 5, i.e., equal to or less than 4, control goes to step 21, where a round-down operation is effected. The integer K is rounded by the processing described above.

The digit place restoration portion 32 reads the index M from the index part storage portion 24 (step 22), and multiplies the rounded-down integer L by the index part $10^M$ and stores the product in the rounded value storage portion 25 (step 23). Finally, in step 24, the numeral stored in the rounded value storage portion 25 is output through the output portion 5 (step 209).

Where the processing illustrated in FIG. 7 is performed in the example described above in which 0.0125 and 0.0125001 are rounded with two significant digits, the numeral is varied from the input to the output in the manner described below.

In the case of 0.0125, it is given by $125 \times 10^{-4}$ and so the integer K is 125 and the index is −4. Accordingly, the index −4 is written to the index part storage portion 24 (step 13). With respect to the integer K, digits 1, 2, and 5 in the successive digit places are written to the integer part storage portion 23 (step 14).

If the digits in the (n+1)th and following digit places (i.e., the third and the following digit places.) of the integer K are returned to one numeral, 5 is extracted (step 15). If this 5 is divided by 5 (step 16), a quotient of 1 is obtained. Therefore, processing of step 17 is performed. In this case, the digit in the nth place, i.e., the second place, is 2. This is divided by 2, resulting in a remainder of 0. Control goes to step 18, where digits in the (n+1)th and the following places, i.e., the third and the following places, are deleted. The result of the processing is 120.

The index −4 stored in the index part storage portion 24 is read (step 22). Calculation $120 \times 10^{-4}$ is performed (step 23). The result of the calculation is 0.012, which is output (step 24).

In the case of 0.0125001, it is given by $125001 \times 10^{-7}$. Therefore, the integer K is 125001, and the index M is −7. Thus, the index −7 is written to the index part storage portion 24 (step 13). With respect to the integer K, digits 1, 2, 5, 0, 0, and 1 in the successive digit places are stored in the integer part storage portion 23 (step 14).

If the digits in the (n+1)th and the following digit places, i.e., the third and the following places, of the integer K are returned to one numeral, 5001 is taken (step 15). If this 5001 is divided by 5 (step 16), the quotient is not 1 and so the processing of step 20 is performed. In this case, the digit in the (n+1)th place, i.e., the third place, is 5. Therefore, control goes to step 19, where rounding up is performed. The result of the processing is 130000.

The index of −7 is read from the. index part storage portion 24 (step 22), and calculation $130000 \times 10^{-7}$ is performed (step 23). A product of 0.013 is output (step 24).

In the description provided above, to avoid misunderstanding of digit places, one numeral formed by the digits in the (n+1)th and following digit places is divided by 5, and a decision is made as to whether the quotient is 1or not (step 16). Alternatively, a decision as to whether this one numeral is 5 or not may be immediately made.

Figure 8:
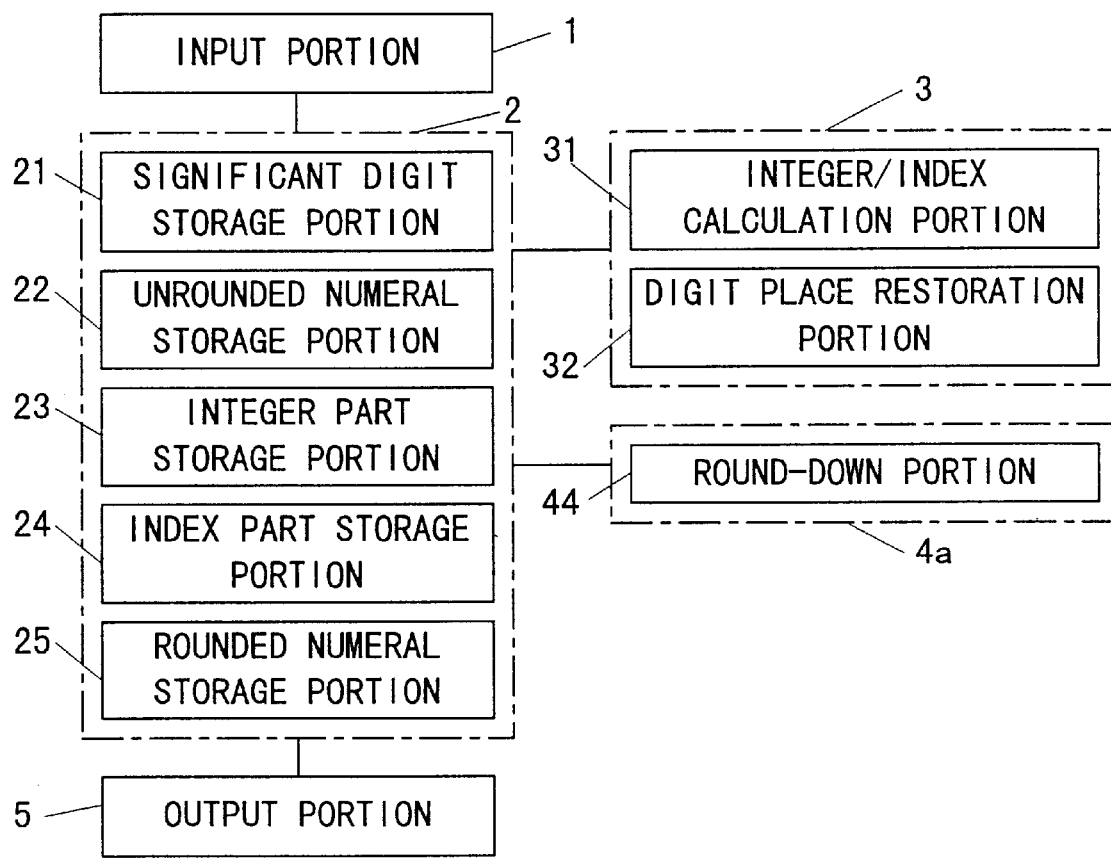
FIG. 8 is a block diagram of a rounding processor in accordance with a fourth embodiment of the invention.

A rounding processor in accordance with a fourth embodiment of the present invention is next described. FIG. 8 is a block diagram showing the structure of the rounding processor in accordance with the fourth embodiment. This rounding processor performs rounding processing by making use of rounding off using significant digits. This rounding processor shown in FIG. 8 is similar to the rounding processor described already in connection. with FIG. 6 except that the five-judging portion 41, the odd/even discrimination portion 42, the round-off judging portion 43, and the round-up portion 45 of the processor shown in FIG. 6 are deleted and that only rounding down is performed by a round-down portion 44. Note that like components are indicated by like reference numerals in various figures and that those components which have been already described will not be described in detail below. The structure of hardware of the rounding processor shown in FIG. 8 realized using a computer is similar to the structure shown in FIG. 2 and so the structure of hardware will not be illustrated.

Figure 9:
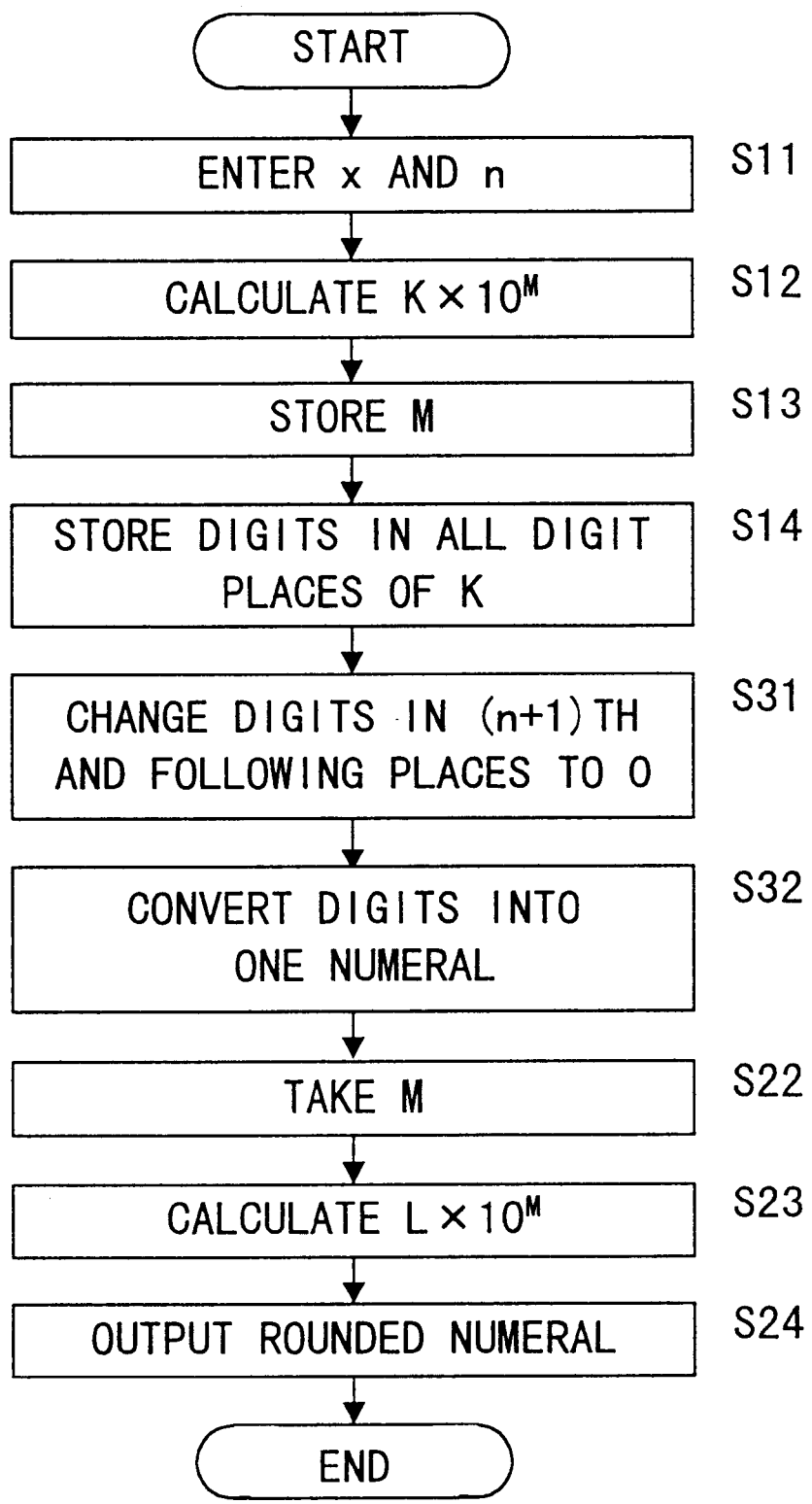
FIG. 9 is a flowchart illustrating rounding processing performed by the rounding processor shown in FIG. 8.

Rounding processing is performed by the rounding processor in the manner described below. FIG. 9 is a flowchart illustrating rounding processing performed by the rounding processor shown in FIG. 8. The flowchart of FIG. 9 is similar to the flowchart of FIG. 7 except that steps 15–21 are replaced by steps 31 and 32. Therefore, only the differences are described.

Referring to FIG. 9, in steps 11–14, processing similar to the processing of steps 11–14 shown in FIG. 7 is performed. In step 31, the round-down portion 44 change digits in the (n+1)th and the following digit places (as counted from the leftmost digit place) of the integer K stored in the integer part storage portion 23 into 0. In. this stage, the digits forming the rounded-down numeral are separately stored in the integer part storage portion 23. In step 32, therefore, the digit place restoration portion 32 converts these values in different digit places into one numeral. For example, digits 3, 2, 0, 0 which are in different digit places and stored in the memory are converted into one numeral 3200. These steps 31 and 32 perform a round-down operation. Various conventional processes other than the illustrated processing method can be used to perform rounding down. The same principle applies to rounding down performed in the third embodiment described above.

In steps 22–24, processing similar to the processing of steps 22–24 illustrated in FIG. 7 is performed. The index M stored in the index part storage portion 24 is multiplied by the rounded down integer L, thus producing a rounded down numeral.

In accordance with the flowchart illustrated in FIG. 9, 0.205 is rounded down with two significant digits. In step 11, 0.205 is entered as numerical value x, and 2 is entered as the number of significant digits n. In step 12, 0.205 is separated into an integer part and an index part, resulting in $205 \times 10^{-3}$. In step 13, an index M of −3 is stored in the index part storage portion 24. In step 14, 205 that is the index M is divided into 2, 0, and 5 and stored in turn in the integer part storage portion 23. In step 31, digits in the (n+1)th digit place and the following digit places are changed to 0. In this case, the least significant digit 5 is changed to 0. In step 32, a row of digits 2, 0, 0 in the integer part storage portion 23 is converted into one numeral 200. In step 22, numeral −3 stored in the index part storage portion 24 is fetched. In step 23, calculation $200 \times 10^{-3}$ is performed, resulting in a rounded down numeral of 0.20.

Figure 10:
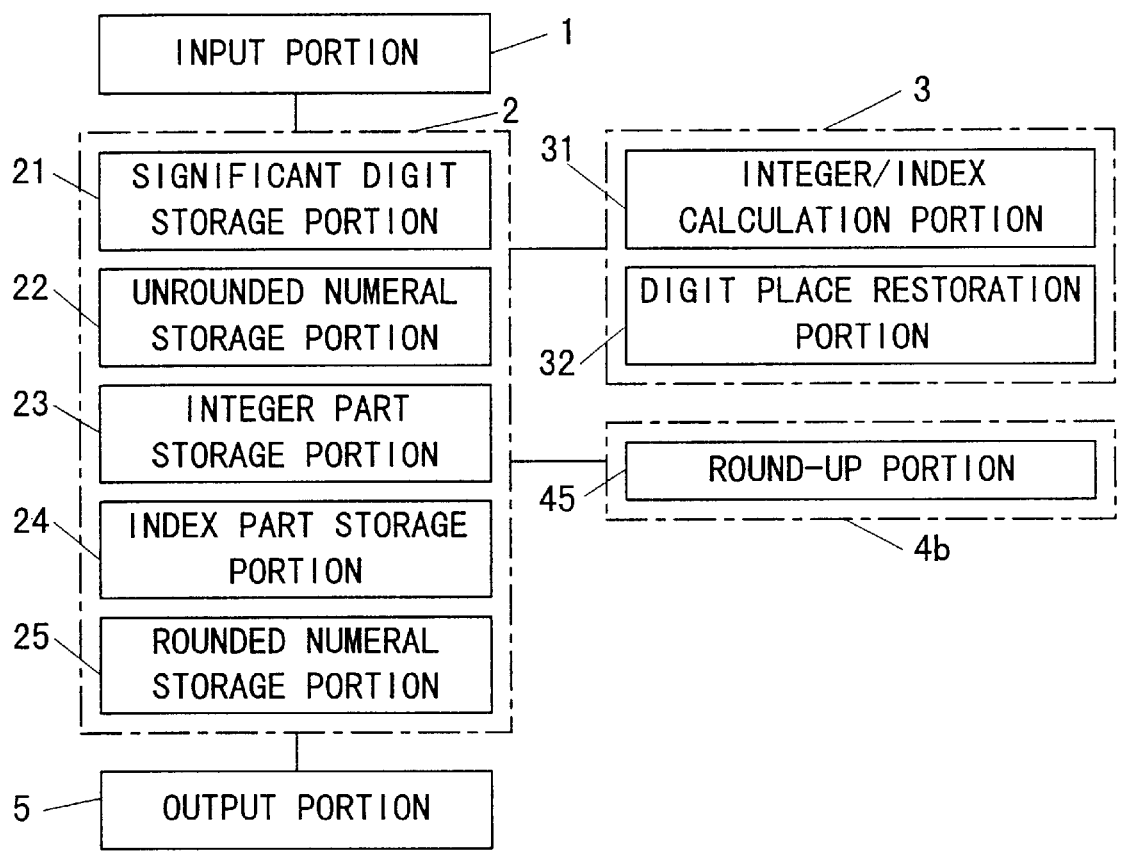
FIG. 10 is a block diagram of a rounding processor in accordance with a fifth embodiment of the invention.

A rounding processor in accordance with a fifth embodiment of the present invention is next described. FIG. 10 is a block diagram showing the structure of this rounding processor in accordance with the fifth embodiment. This processor performs rounding processing by making use of rounding up using significant digits. This rounding processor shown in FIG. 10 is similar to the rounding processor shown in FIG. 6 except that the five-judging portion 41, the odd/even discrimination portion 42, the round-off judging portion 43, and the round-down portion 44 are omitted and that only a round-up portion 45 performs a round-up operation. Note that like components are denoted by like reference numerals in various figures and that those components which have been already described will not be described in detail below. The hardware of the rounding processor shown in FIG. 10 which is realized using a computer is similar to that shown in FIG. 2 and so the hardware is not illustrated.

Figure 11:
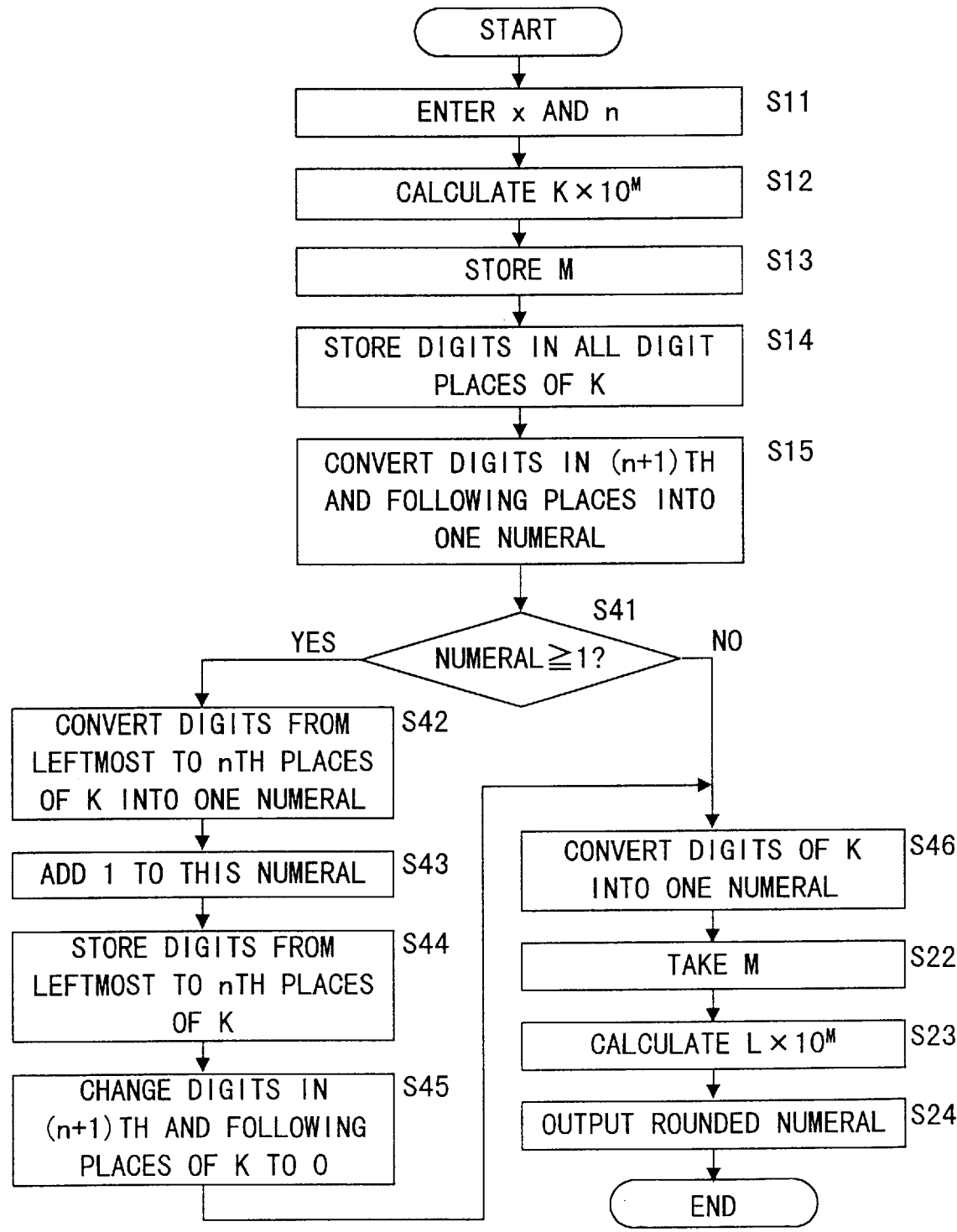
FIG. 11 is a flowchart illustrating rounding processing performed by the rounding processor shown in FIG. 10.

Rounding processing executed by the rounding processor described above is described. FIG. 11 is a flowchart illustrating the processing performed by the rounding processor shown in FIG. 10. The flowchart of FIG. 11 is similar to the flowchart of FIG. 7 except that steps 16–21 of the flowchart of FIG. 10 are replaced by steps 41–46. Therefore, only the differences are described below.

Referring to FIG. 11, in steps 11–15, the same processing as the processing of steps 11–15 illustrated in FIG. 7 is performed. In step 41, the round-up portion 45 makes a decision as to whether one numeral formed by digits in the (n+1)th and the following digit places is equal to or greater than 1. No round-up operation is performed unless it is equal to or greater than 1, and control goes to step 46. If this one numeral is equal to or greater than 1, the round-up portion 45 performs rewriting processing of steps 42–45.

In step 42, the original digits from the leftmost digit place to the nth digit place are regained and converted into one numeral. In the next step 43, 1 is added to this one numeral. In step 44, the digits in the successive digit places are again stored in turn in the integer part storage portion 23. In the next step 45, the digits in the (n+1)th and the following digit places of the integer part K stored are changed to 0.

In the next step 46, an integer/index calculation portion 3 fetches the digits at the successive digit places from the integer part storage portion 23. The digits are returned to one numeral. These steps 41–46 are used to perform a round-up operation. Various conventional processes other than the illustrated processing method can be used to perform rounding up. The same principle applies to the rounding up performed in the third embodiment described above.

In steps 22–24, the same processing as the processing of steps 22–24 illustrated in FIG. 7 is performed. The index M stored in the index part storage portion 24 is multiplied by the rounded up integer L, and a rounded up numeral is output.

In the processing procedure described above, 1270400 is now rounded up with two significant digits. First, in step 11, 1270400 is entered as a numerical value x, and 2 is entered as the number of significant digits n. Since 1270400 is given by $12704 \times 10^2$, the integer K is 12704 and the index M is 2. Therefore, "2" is stored in the index part storage portion 24 (step 13). Digits 1, 2, 7, 0, and 4 are stored in turn in the integer part storage portion 23 (step 14).

In step 15, the digits 7, 0, and 4 in the (n+1)th and the following digit places are taken and converted into one numeral 704. Since this numeral is greater than 1, control goes to step 42 (step 41). In step 42, the digits 1 and 2 in the digit places up to the nth digit place of the integer K, i.e., up to the second digit place, are extracted and converted into one numeral 12. In step 43, "1" is added to this numeral, resulting in 13. The digits of the numeral are stored again in turn in the integer part storage portion 23 (step 44). As a result of this processing, digits 1, 3, 7, 0, and 4 are stored in turn in the integer part storage portion 23. The digits 7, 0, and 4 in the (n+1)th and the following digit places, i.e., the third and the following digit places, are changed to 0 (step 45). The digits stored in the integer part storage portion 23 are 1, 3, 0, 0, and 0. Converting these digits back to one numeral gives rise to 13000 (step 46). Finally, "2" is read from the index part storage portion 24 (step 22). A multiplication $13000 \times 10^2$ is performed (step 23). A product of 1300000 is output (step 24).

Figure 12:
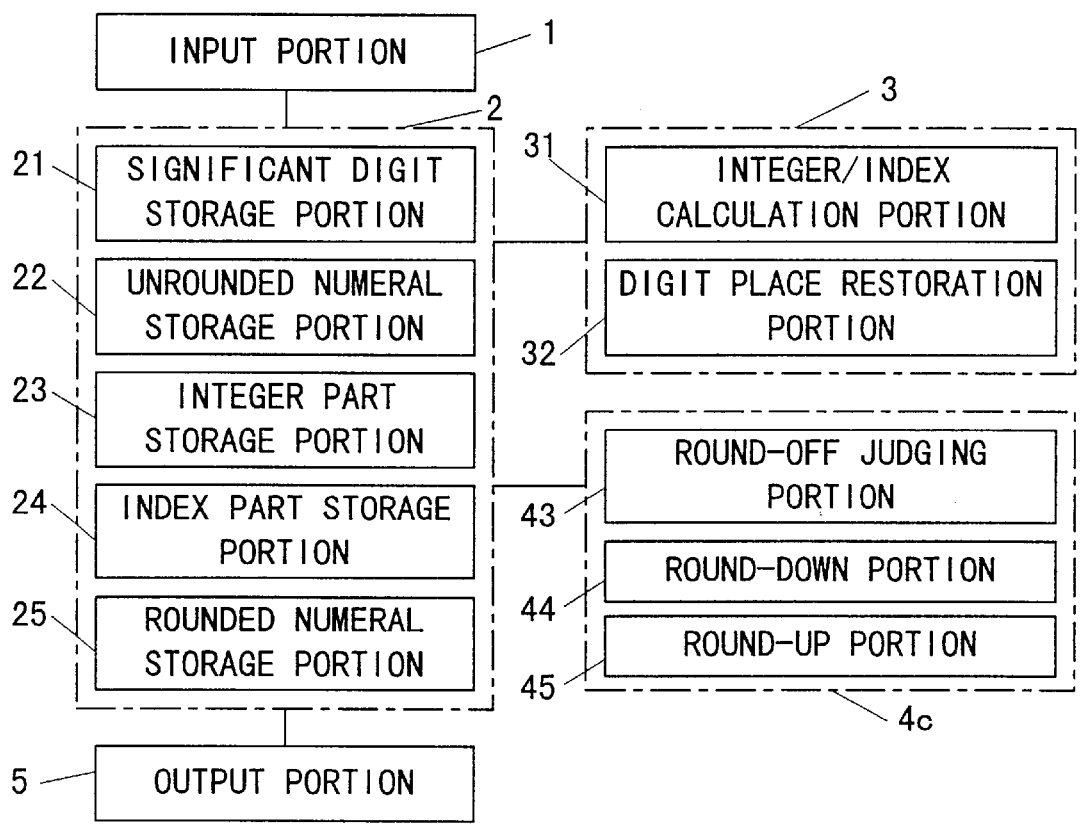
FIG. 12 is a block diagram of a rounding processor in accordance with a sixth embodiment of the invention.

A rounding processor in accordance with a sixth embodiment of the present invention is next described. FIG. 12 is a block diagram showing the configuration of the rounding processor in accordance with the sixth embodiment. This rounding processor serves to perform rounding processing by rounding off using significant digits. This rounding processor shown in FIG. 12 is similar to the rounding processor shown in FIG. 6 except that the five-judging portion 41 and the odd/even discrimination portion 42 of the rounding processor shown in FIG. 6 are omitted and that a round-down portion 44 performs rounding down or a round-up portion 45 performs rounding up, depending on the result of the decision made by the round-off judging portion 43. Like component are indicated by like reference numerals in various figures and that those components which have been already described will not be described in detail. The hardware of the rounding processor shown in FIG. 12 realized using a computer is similar to that shown in FIG. 2 and thus will not be illustrated.

Figure 13:
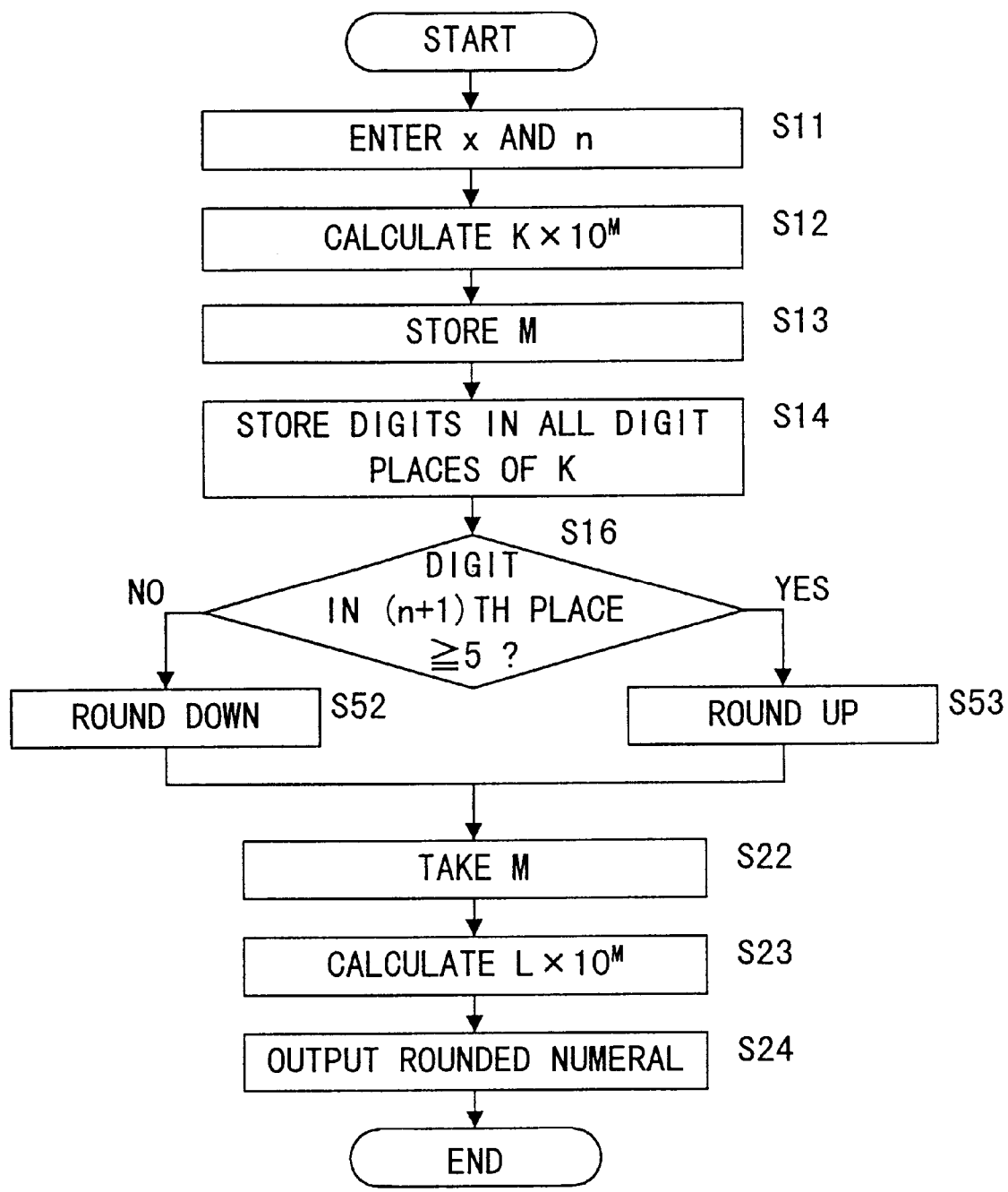
FIG. 13 is a flowchart illustrating rounding processing performed by the rounding processor shown in FIG. 12.
Figure 14:
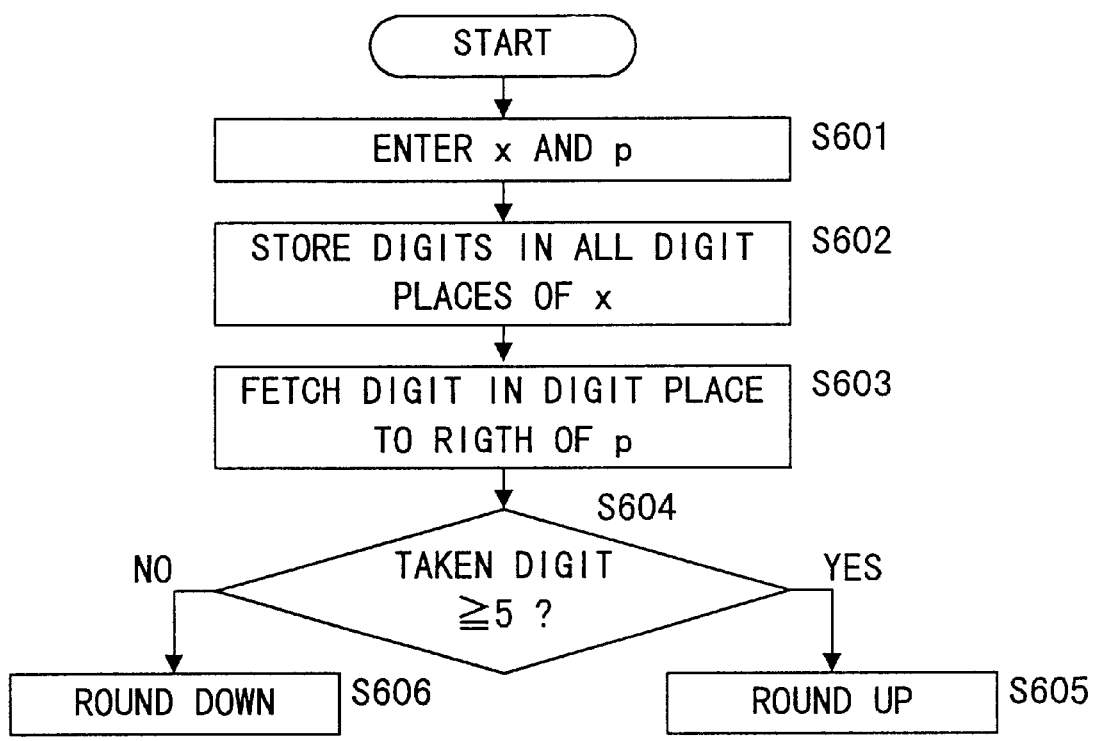
FIG. 14 is a flowchart illustrating the prior art processing procedure for rounding.
Figure 15:
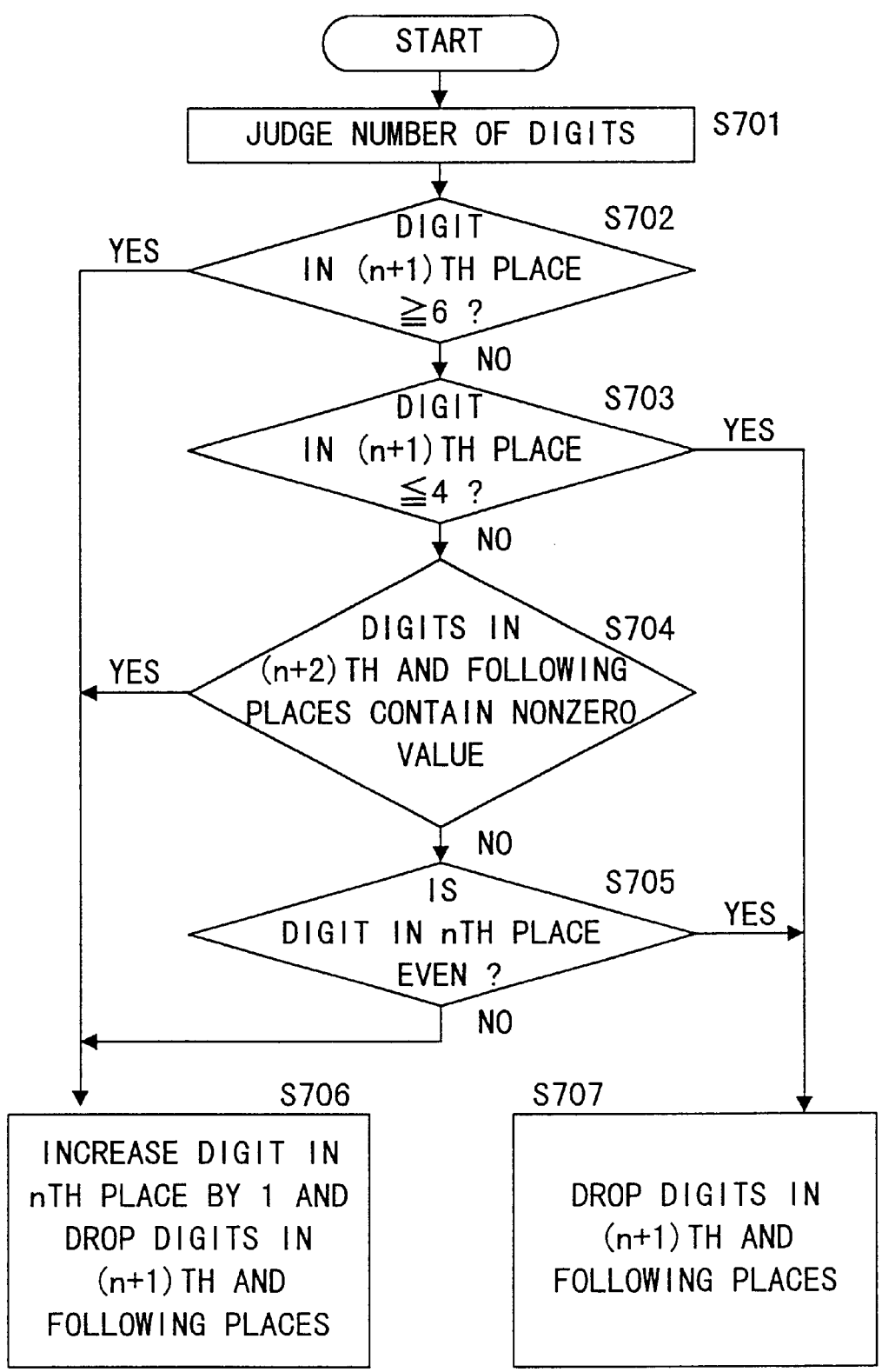
FIG. 15 is a flowchart illustrating the prior art processing procedure for performing rounding specified by JIS, using a computer.
Figure 16:
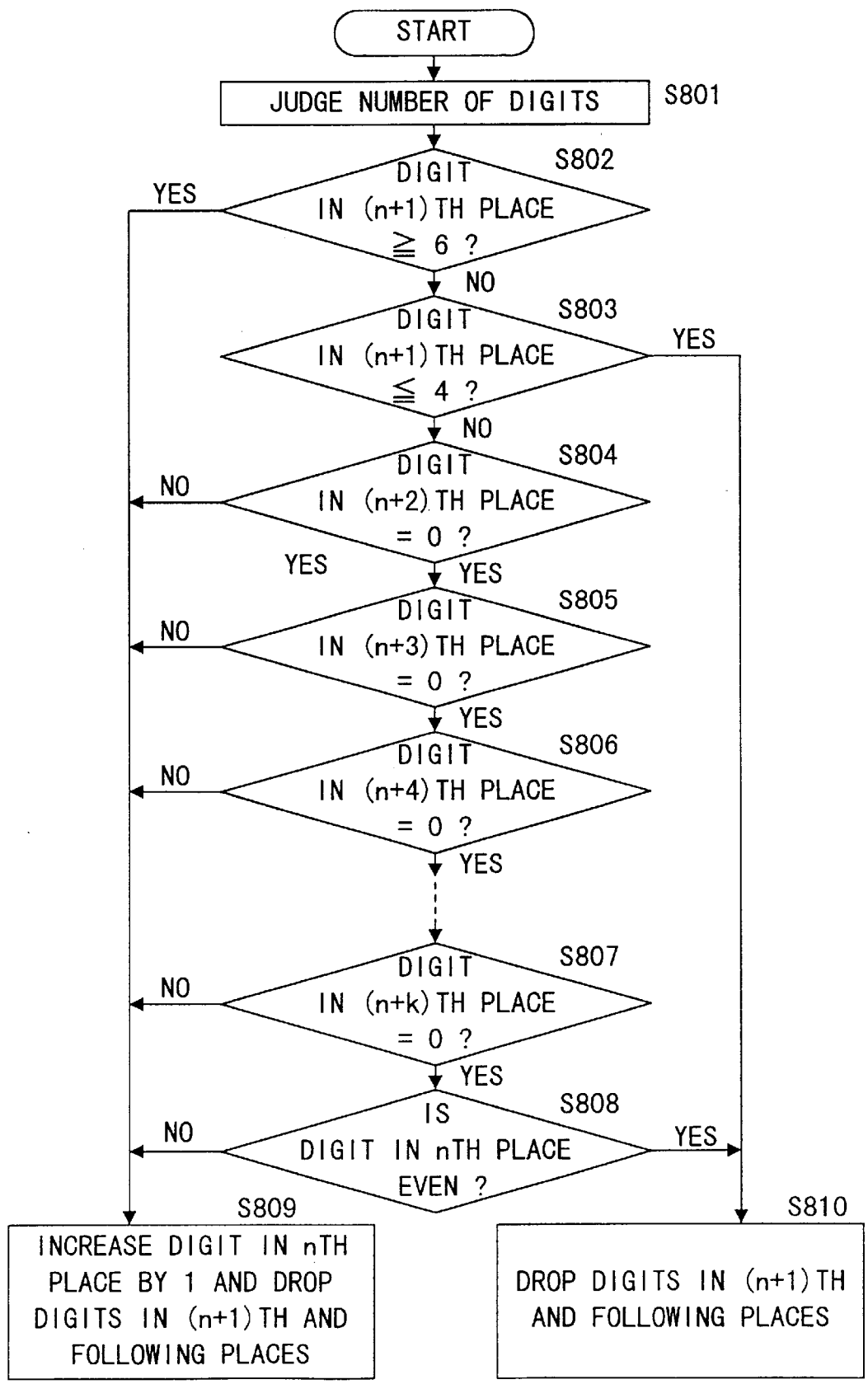
FIG. 16 is a flowchart illustrating the prior art processing procedure for performing rounding specified by JIS, using a computer, by detailed branching processing.

The rounding processor described above performs rounding processing as described below. FIG. 13 is a flowchart illustrating the rounding processing performed by the rounding processor shown in FIG. 12. The flowchart of FIG. 13 is similar to the flowchart of FIG. 7 except that steps 15–21 of FIG. 7 are replaced by steps 51–53.

As illustrated in FIG. 13, in steps 11–14, the same processing is performed as the processing done by steps 11–14 illustrated in FIG. 7. In step 51, a round-off judging portion 4 reads the digit in the (n+1)th digit place from the integer part storage portion 23 and makes a decision as to whether the digit is equal to or greater than 5. If the result of the decision is YES, control goes to step 53, where rounding up is performed. If the result of the decision is NO, control proceeds to step 52, where rounding down is carried out. These rounding up and rounding down can be the operations illustrated in FIG. 9 (steps 31 and 32) or the operations illustrated in FIG. 11 (from step 15 to step 46). Furthermore, various conventional algorithms can be employed.

In steps 22–24, the same processing as the processing executed by the steps 22–24 illustrated in FIG. 7 is performed. The index M stored in the index part storage portion 24 is multiplied by the rounded down integer L, producing a rounded off numeral.

In the third through sixth embodiments described above, the numeral to be processed is separated into an integer part and an index part. Therefore, the digit place to be rounded can be specified by the number of significant digits. Where rounding specified by JIS is performed as in the third embodiment, the numeral is divided into an integer part and an index part. Then, the digit in the (n+1)th and digits following it are taken as one numeral and divided by 5.

Consequently, a decision as to whether the digit in the (n+1)th digit place is 5 and the rightmost nonzero digit can be made with a quite few conditional branches. Hence, the processing can be performed quickly. Furthermore, the program can be created with greater ease.

As described above, with the rounding processor in accordance with the present invention, it is easy to create a program. Also, the processing time can be shortened. This means that the processor can be realized by software without almost affected by the computer's processing capability. The processing procedure in accordance with the present invention can be applied to various applications using rounding. Examples of application of the present invention include:

(1) The rounding processing is incorporated as a function in a spreadsheet program. Examples of spreadsheet software programs include Excel, Lotus 1-2-3, and Sanshiro (distributed in Japan).

(2) The rounding processing is incorporated in software programs for finding nitrogen oxide concentrations and software programs for finding the concentrations of constituents of chemicals.

(3) The rounding processing is incorporated in analytical instruments and measuring instruments including electrochemical analysis instruments, optochemical analysis instruments, electromagnetic analysis instruments, isolation analysis instruments, and thermoanalysis instruments.

(4) The rounding processing is incorporated in instruments for measuring physical quantities and physical properties including thermometers, hygrometers, dewpoint sensors, photometers, and colorimeters.

(5) The rounding processing is incorporated in special instruments such as development and research-related instruments, biological instruments, agricultural instruments, forest-associated instruments, marine product-associated instruments, stockbreeding-associated instruments, meteorological instruments, and ocean observational instruments.

(6) The rounding processing is used for operations for examinations and registrations in ISO 9000 and ISO 14000. For example, it can be incorporated in testing, measuring, and monitoring hardware or can be used with software programs for tests, measurements, and monitoring.

What is claimed is:

1. A rounding apparatus comprising:

an input portion for entering a numerical value x to be rounded and a rounding interval w;

a first storage portion which comprises a numeral storage portion for storing digits in successive digit places of the entered numerical value x;

a second storage portion for storing the entered rounding interval w; and a rounding processing portion for rounding the numerical value x stored in said first storage portion with a digit place determined by the rounding interval w stored in said second storage portion, and including a less significant numeral extraction portion for extracting a less significant numerical value y composed of digits in digit places to the right of a digit place corresponding to the rounding interval w stored in said rounding interval storage portion, a rounding interval rounding processing portion for replacing the numerical value x stored in said numeral storage portion by a numerical value selected from a sequence of multiples of the rounding interval w stored in said rounding interval storage portion according to result of a comparison of the rounding interval w stored in said rounding interval storage portion with twice of the less significant numerical value y extracted by said less significant numeral exaction portion, said rounding interval rounding portion comprising a remainder calculation portion for calculating a remainder b occurring when the rounded digit R extracted by said rounded numeral extraction portion is divided by 2, an adder portion for adding 1 to the rounded digit R extracted by said rounded numeral exaction portion if the rounding interval w stored in said rounding interval storage portion is smaller than twice of the less significant numerical value y extracted by said less significant numeral extraction portion or if the rounding interval w stored in said rounding interval storage portion is equal to twice of the less significant numerical value y extracted by said less significant numeral extraction portion and, at the same time, the remainder b calculated by said remainder calculation portion is 1, and a dropping portion for dropping the less significant numerical value y extracted by said less significant numeral extraction portion, and a rounded numeral extraction portion for extracting a rounded digit R from the numerical value x stored in said numeral storage portion, the rounding digit R being in a digit place corresponding to the rounding interval w stored in said rounding interval storage portion.

2. A rounding method comprising the steps of:

entering a numerical value x to be rounded and a rounding interval w;

storing the entered numerical value x by storing digit in successive digit places of the entered numerical value x in a numeral storage portion;

storing the entered rounding interval w in a rounding interval storage portion; and rounding the stored numerical value x with a digit place determined by the stored rounding interval w, including extracting a less significant numerical value y formed by digits in digit places to the right of a digit place corresponding to the rounding interval w stored in said rounding interval storage portion from the numerical value x stored in said numeral storage portion, and replacing the numerical value x stored in said numeral storage portion by a numerical value selected from a sequence of multiples of the rounding interval w stored in said rounding interval storage portion according to result of a comparison of the rounding interval w stored in said rounding interval storage portion with twice of the less significant numerical value y; and extracting a rounded digit R placed in a digit place corresponding to the rounding interval w stored in said rounding interval storage portion from the numerical value x stored in said numeral storage portion, and wherein said step of replacing the numerical value x by the selected numerical value includes calculating a remainder b when said extracted rounded digit R is divided by 2 and adding 1 to said extracted rounded digit R if the rounding interval w stored in said interval storage portion is less than twice of said extracted less significant numerical value y or if the rounding interval w stored in said rounding interval storage portion is equal to twice of said extracted less significant numerical value y and, at the same time, the calculated remainder b is 1, and dropping the extracted less significant numerical value y.

3. A recoding medium capable of being read by a computer, said recording medium being loaded with a computer program to cause the computer to run steps:

entering a numerical value x to be rounded and a rounding interval w;

storing the entered numerical value x, including storing digits in successive digit places of the entered numerical value x in a numeral storage portion;

storing the entered rounding interval w in a rounding interval storage portion; and rounding the stored numerical value x with a digit place determined by the stored rounding interval w, including extracting a less significant numerical value y formed by digits in digit places to the riot of a digit place corresponding to the rounding interval w stored in said rounding interval storage portion from the numerical value x stored in said numeral storage portion, and replacing the numerical value x stored in said numeral storage portion by a numeral selected from a sequence of multiples of the rounding interval w stored in said rounding interval storage portion according to result of a comparison of the rounding interval w stored in said rounding interval storage portion with twice of the less significant numerical value y, wherein said program further causes said computer to run the step of extracting a rounded digit R placed in a digit place corresponding to the rounding interval w stored in said rounding interval storage portion from the numerical value x stored in said numeral storage portion, and wherein said step of replacing the numerical value x by the selected numerical value includes calculating a remainder b when said extracted rounded digit R is divided by 2 and adding 1 to said extracted rounded digit R if the rounding interval w stored in said interval storage portion is less than twice of said extracted less significant numerical value y or if the rounding interval w stored in said rounding interval storage portion is equal to twice of said extracted less significant numerical value y and, at the same time, the calculated remainder b is 1, and dropping the extracted less significant numerical value y.

* * * * *

UNITED STATES PATENT AND TRADEMARK OFFICE
CERTIFICATE OF CORRECTION

PATENT NO.     : 6,493,738 B1
DATED          : December 10, 2002
INVENTOR(S)    : Tomoaki Yoshimi It is certified that error appears in the above-identified patent and that said Letters Patent is hereby corrected as shown below:

Column 18,
Lines 6 and 12, which reads "exaction", should read -- extraction --.

Signed and Sealed this

Third Day of August, 2004

JON W. DUDAS
*Acting Director of the United States Patent and Trademark Office*